(12) United States Patent
Darland et al.

(10) Patent No.: US 6,229,819 B1
(45) Date of Patent: May 8, 2001

(54) ADVANCED INTELLIGENT NETWORK GATEWAY

(75) Inventors: Timothy Darland; Robert F. Dickerman, both of Cedar Rapids; Christopher P. Tofanelli, Marion, all of IA (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/967,339

(22) Filed: Oct. 21, 1997

(51) Int. Cl.[7] .............................. H04J 3/16; H04M 15/00
(52) U.S. Cl. ............................................... 370/467
(58) Field of Search ..................... 370/352, 373, 370/384, 401, 410, 426, 465, 466, 467, 377, 385; 379/220, 219, 221, 207, 111, 230, 113, 115

(56) References Cited

U.S. PATENT DOCUMENTS

| 4,232,199 | 11/1980 | Boatwright et al. ............. 179/18 B |
| 4,577,061 | 3/1986 | Katzeff et al. ................... 179/2 AM |

(List continued on next page.)

FOREIGN PATENT DOCUMENTS

| WO 91/16779 | 10/1991 | (WO) ........................... H04M/1/66 |
| WO/91/16779 | 10/1991 | (WO) . |

OTHER PUBLICATIONS

"Gazing into the SPC network future reveals vista of new features," Gordon and Hodges, Telephony Magazine, Mar. 21, 1983.

"Signaling System 7 Rescues antiquated billing system," Jonelit, Telephony Magazine, Dec. 2, 1991.

"Smart Credit Cards: the answer to cashless shopping," Weinstein, IEEE Spectrum, Feb. 1984.

"Excel Switching", electronic brochure, www.xl.com/prod.htm.

"VCO Open Programmable Switches," electronic brochure, www.summa4.com/products/wpswitch.htm.

(List continued on next page.)

Primary Examiner—Chau Nguyen
Assistant Examiner—Chiho Andrew Lee

(57) ABSTRACT

An advanced intelligent network gateway that allows communication between telecommunications network component that use different protocols. In one embodiment, the advanced intelligent network gateway is used to communicate between a manual operator console that are processing a customer's telephone call and a service data point which is a database containing information needed to process the customer's telephone call. However, the advanced intelligent network gateway may also be used to receive and transmit messages between other telecommunications components. In addition, methods for protocol conversion are described. One method for protocol conversion is for the conversion of a transaction capabilities application part message from a user datagram protocol/internet protocol implementation to a transmission control protocol/internet protocol implementation or vice versa. Methods for receiving and transmitting transaction capabilities application part messages are also described.

20 Claims, 13 Drawing Sheets

U.S. PATENT DOCUMENTS

| | | | |
|---|---|---|---|
| 4,611,096 | 9/1986 | Asmuth et al. | 179/18 B |
| 4,625,081 | 11/1986 | Lotito et al. | 379/88 |
| 4,685,127 | 8/1987 | Miller et al. | 379/221 |
| 4,706,275 | 11/1987 | Kamil | 379/144 |
| 4,782,519 | 11/1988 | Patel et al. | 379/221 |
| 4,791,640 | 12/1988 | Sand | 370/58 |
| 4,893,330 | 1/1990 | Franco | 379/91 |
| 5,068,891 | 11/1991 | Marshall | 379/91 |
| 5,195,086 | 3/1993 | Baumgartner et al. | 370/62 |
| 5,222,120 | 6/1993 | McLeod et al. | 379/88 |
| 5,452,350 | 9/1995 | Reynolds et al. | 379/220 |
| 5,555,244 * | 9/1996 | Gupta et al. | 370/401 |
| 5,590,181 | 12/1996 | Hogan et al. | 379/114 |
| 5,640,446 | 6/1997 | Everett et al. | 379/119 |
| 5,732,213 | 3/1998 | Gessel et al. | 395/200.54 |
| 5,774,695 | 6/1998 | Autrey et al. | 395/500 |
| 5,793,771 * | 8/1998 | Darland et al. | 370/467 |
| 5,987,118 * | 11/1999 | Dickerman et al. | 379/365 |

OTHER PUBLICATIONS

"The Centrex Call Center Advantage," electronic brochure, www.nortel.com/pen/solutions/acd.html.

"Centrex Call Center Tailoring for your Business", electronic brochure, www.nortel.com/pen/solutions/tailoring.html.

"Centrex CTI", electronic brochure, www.nortel.com/pen/solutions/cti.html.

"Centrex Call Center Reporting Options," electronic brochure, www.nortel.com/pen/solutions/reporting.html.

Weinstein, S., "Smart credit cards: the answer to cashless shopping", *IEEE Spectrum,* Feb. 1984, pp. 43–49.

Joneleit, P. "Signaling System 7 rescues antiquated billing system", *Telephony,* Dec. 2, 1991, pp. 32, 34 and 36.

Gordon et al., "Gazing into the SPC network future reveals vista of new features", *Telephony,* Feb. 21, 1983, pp. 86–93.

"DMS–250 Long Distance Switch Product Information: Product Technical Overview", Northern Telecom, from http://www.nortel.com/broadband/dms/250/250information.html, Copyright 1996.

Briere, D., "The secret to success with virtual nets", *Network World,* vol. 9, No. 12, Mar. 23, 1992, pp. 1, 31 and 41–43.

* cited by examiner

ADVANCED INTELLIGENT NETWORK GATEWAY

RELATED APPLICATIONS

The following applications of common assignee contain some common disclosure, and are believed to have an effective filing dates identical with that of the present invention.

SYSTEM AND METHOD FOR PROVIDING OPERATOR AND CUSTOMER SERVICES FOR INTELLIGENT OVERLAY NETWORKS, Attorney Docket No. CDR-96-008 (1575.2230000), incorporated herein by reference in its entirety.

ENHANCED OPERATOR CONSOLE, Attorney Docket No. CDR-96-010 (1575.2220000), incorporated herein by reference in its entirety.

VALIDATION GATEWAY, Attorney Docket No. CDR-96-011 (1575.2250000), incorporated herein by reference in its entirety.

BACKGROUND OF THE INVENTION

1. Field of the Invention

The present invention relates generally to computer systems, and more particularly to providing a messaging interface between one or more computer system environments.

2. Related Art

Telecommunications network products are services provided by telephone companies that are carried on telecommunications networks. A widely known example is dial-1 long distance voice service which allows a customer to dial a 1 plus a ten digit number from his or her home telephone, talk to a party who answers the telephone on the line of the ten digit number dialed, and pay for the telephone call when billed at the end of the month. Although dial-1 is popular, other calling and payment options are sometimes preferable. For example, a calling card call allows an individual to make a call from a phone other than their home phone and charge the call to the home phone account using the calling card.

One such calling and payment option is debit calling which is also referred to as prepaid calling. Debit calling allows a customer to put finds in an account and have those funds debited each time a telephone call is made. Standard debit call processing includes verification of the account balance prior to connecting the call and ongoing balance verification during the call. An example of a typical debit calling customer is a parent who purchases a debit calling card for a child away from home.

Debit calling, as well as other calling and payment options, are carried on a telecommunications network. A telecommunications network comprises two basic elements: telecommunications equipment, which may also be referred to as network components, and links which connect the equipment or components. Because call handling and information processing for debit calling differs from other voice services, debit calls are handled by specialized components in the telecommunications network. That is, debit calls are handled using a specialized computer system.

A computer system, such as the those used for debit calling, has a need to communicate with other computer systems to exchange information between one or more computer programs executing on each computer system. A particular computer program may need to communicate with programs which are executed on the same computer system or with programs which are executed on other systems throughout the network.

To allow computer programs to communicate with each other, developers write programs to be compatible with standards or protocols. A standard or protocol may be used throughout the telecommunications industry or it may be owned by a private entity for use with computer systems sold or operated by that entity. Protocols determine what information is transmitted, what timing values should be associated with the transfer of information, and what format should be used to transmit the information.

Debit calling is processed by a plurality of computer systems that provide switching and routing functionality, handle individual calls, and store customer account information. However, computer systems typically run programs that use different protocols. Unfortunately, a computer program using one protocol generally cannot communicate with a computer program using another protocol.

This can be overcome by providing code in the computer program that translates the protocol received from and sent to the other computer program. However, if a computer program needs to communicate with multiple computer programs, a significant amount of additional code may be needed to allow the computer programs to communicate.

As the length of a computer program increases, the cost of developing, building, and maintaining the computer system increases. Also, lengthy code and complex equipment requirements increase the possibility of maintenance problems. Development time and cost increase because longer computer programs require more manpower and time to develop. Cost of building the computer system increases because additional equipment such as links and memory are required. Maintenance costs increase because the additional code and equipment are more costly to maintain. Also, additional equipment and code increase the chances of more performance problems because the additional equipment may have failures and the additional code may have errors that will affect the entire program or system.

SUMMARY OF THE INVENTION

The system and method of the present invention allow communication between telecommunications network components that provide debit customers access to manual operator consoles for customer services. A debit customer that wishes customer service will be routed to a manual operator console. However, the manual operator console does not contain debit customer account information. In order to process the call, the manual operator console accesses a service data point (SDP) to obtain debit customer account information.

Unfortunately, the SDP uses a different protocol than he manual operator consoles. The present invention includes an advanced intelligent network gateway (AINGW) which is a computer system that provides message transfer and protocol conversion allowing communication between the manual operator consoles and the SDP. The AINGW of the present invention can act as a single point of interface between multiple computer programs using different protocols.

The manual operator console communicates using encoded TCAP messages embedded in MCI's proprietary transmission protocol network information distribution service (NIDS) sequenced packet protocol (NSPP). NSPP is an implementation of user datagram protocol/internet protocol (UDP/IP) and provides communication with client-server programs. In a preferred embodiment of the present invention, the SDP communicates using transmission control protocol/internet protocol (TCP/IP). The AINGW provides a system and method for converting between the NSPP-based encoded TCAP messages going to and coming from the operator consoles to the TCP/IP-based encoded TCAP messages going to and coming from the SDP. Please refer to the attached Glossary for a reference of acronyms and their definitions.

The AINGW of the present invention comprises several software layers for message transfer and protocol conversion needed for communication between the manual operator consoles and the SDP. The AINGW includes a basic overseer service (BOSS), an advanced intelligent network application (AIN_APP), an interprocess communications manager (IPC_MGR), a NSPP interface module (NIM), an alarm screener, and an operational measurements (OM) module. The BOSS is responsible for staring, stopping, and monitoring the processes on the AINGW. The AIN_APP is a computer program that includes software layers for receiving, processing, and sending messages between the NIM and the IPC_MGR. The NIM is a NSPP client and server. The IPC_MGR is a TCP/IP peer to peer network element.

The AIN_APP performs protocol conversion by receiving the message from NIM and sending it to the ICP_MGR. The NIM unpacks the message from the NSPP packet before sending it to AIN_APP. The AIN_APP sends the message to the IPC_MGR, which packs it in a TCP packet and sends it to the SDP. For the response, the IPC_MGR unpacks the message from the TCP frame before giving it to the AIN_APP. The AIN_APP sends the message to the NIM, which packs it in a NSPP packet and sends it to the manual operator console.

In order to process messages sent between the NIM and the IPC_MGR, the AIN_APP performs multiple steps for protocol conversion. Protocol conversion for messages sent from the NIM to the IPC_MGR involves decoding the message, storing information from the message temporarily in an array, and reformatting the message. Protocol conversion for messages sent from the IPC_MGR to the NIM involves decoding the message, validating that an error response message was not sent, retrieving information stored in an array, and repopulating the information in the response message.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

DETAILED DESCRIPTION OF THE PREFERRED EMBODIMENTS

Figure 1:
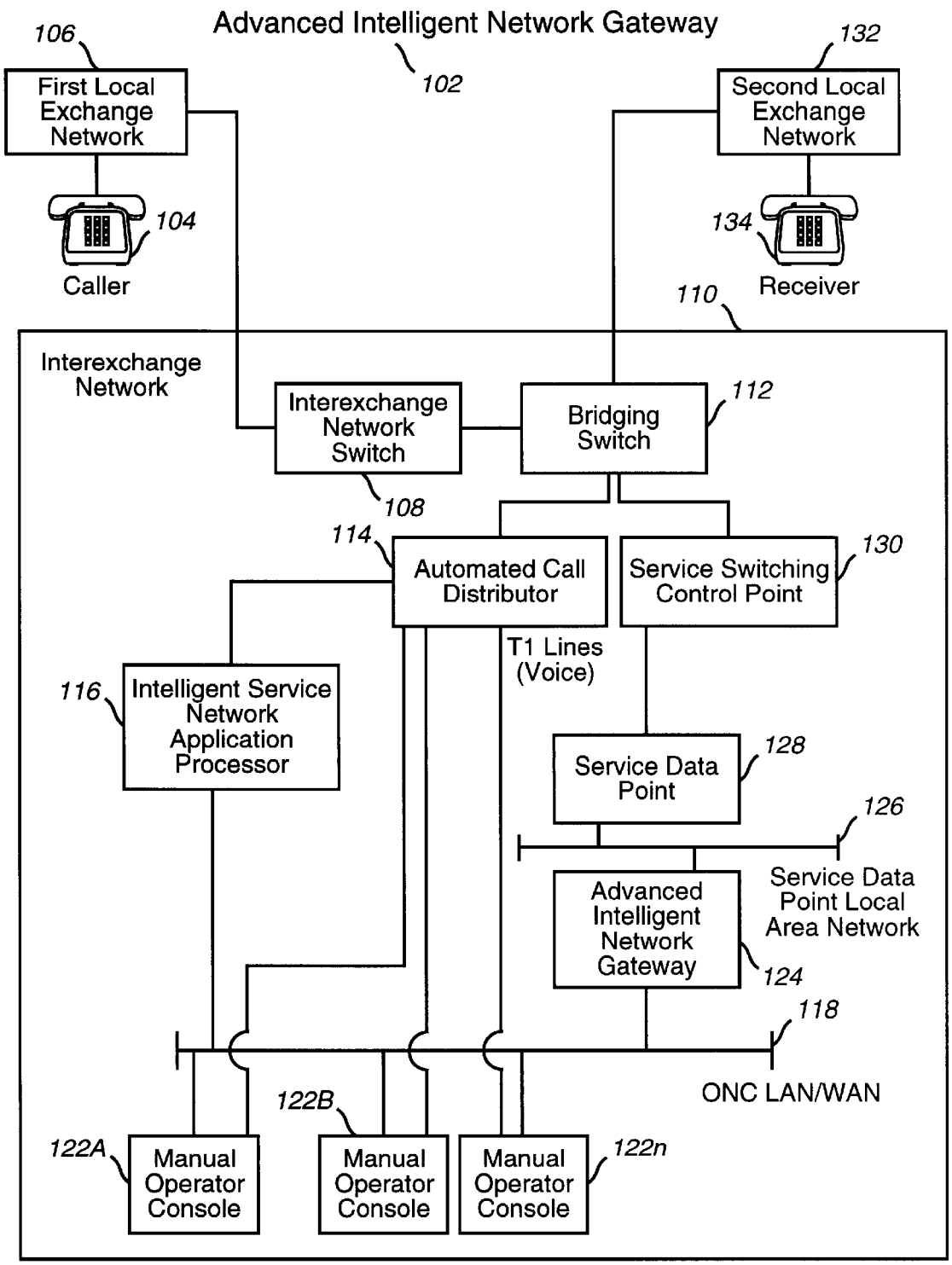
FIG. 1 is a block diagram of an advanced intelligent network gateway (AINGW) interface environment according to a preferred embodiment of the present invention.

FIG. 1 is a block diagram of an advanced intelligent network gateway (AINGW) interface environment 102. The AINGW 124 is an interface between a service data point (SDP) 128 and one or more manual operator consoles 122. The AINGW 124 allows information to flow from the SDP 128, which stores debit customer account information, to the manual operator consoles 122A, 122B ... 122n that are used by human operators to process calls. In order to allow communication between the SDP which uses transmission control protocol/internet protocol (TCP/IP) and the manual operator consoles 122 which communicate to the telecommunications network using network information distribution service (NIDS) sequenced packet protocol (NSPP) which is an implementation of user datagram protocol/Internet protocol (UDP/IP), the AINGW 124 preforms protocol conversion between TCP/IP and NSPP (UDP/IP).

The AINGW interface environment 102 is one possible environment of an AINGW 124. The AINGW interface environment 102 described below is included in a telecommunications network that processes debit calls. The telecommunications network includes several networks such as first and second local exchange networks 106 and 132 and an interexchange network 110. The interexchange network 110 comprises a plurality of switches including an exemplary interexchange network switch 108 and an exemplary bridging switch 112. In addition, within the interexchange network 110, a service switching control point (SSCP) 130, an automated call distributor (ACD) 114, an intelligent service network applications processor (ISNAP) 116, manual operator consoles 122, the AINGW 124, and the SDP 128 are used to process debit customer service calls.

The AINGW interface environment 102 can best be described by referencing the processing of a typical call. A call is placed by a debit customer dialing an 800 number using a telephone 104. The call is received by a first local exchange network 106. A first local exchange network 106 comprises switches and termination equipment within a localized area. An example of a first local exchange network 106 is a local telephone operating company network such as Bell Atlantic. The first local exchange network 106 sends the call to an interexchange switch 108 in an interexchange network 110.

Similar to the first local exchange network 106, an interexchange network 110 comprises a plurality of switches, also referred to as exchanges, that are located throughout a geographic area For example, a national interexchange network 110 comprises switches located throughout the nation. The interexchange network 110 is typically used to process long-distance telephone calls. When a call is routed to the interexchange network 110, it may be routed to one or more switches within the interexchange network.

If the call is received by the interexchange network switch 108, the interexchange network switch 108 will route the call to a bridging switch 112. The bridging switch 112 will then route the call to the SSCP 130. Alternatively, if a bridging switch 112 receives the call, the bridging switch 112 will route the call directly to the SSCP 130. The switches in the interexchange network 110, including the interexchange network switch 108 and the bridging switch 112, may be implemented using DMS-250 switches manufactured by Nortel.

When a customer requires customer service assistance, or if the customer wants to recharge his or her prepaid card, a human operator may assist. The SSCP 130 sends the call to the ACD 114 by generating a message with the 800 number dialed by the customer. The SSCP 130 sends the call to the ACD 114 via the bridging switch 112.

After the bridging switch 112 sends the call to the ACD 114, the ACD 114 communicates with the ISNAP 116 to route the call to a manual operator console 122A. The call is handled as a new call by ACD 114. Exemplary manual operator console 122A allows a human operator to handle one individual debit call at a time. Manual operator consoles 122 are logically grouped together in groups. The ISNAP 116 selects a manual operator console 122A and ensures that incoming calls are distributed among the logically defined groups. The ISNAP 116 has a database containing routing information (group number) for the 800 number used to dial the call. The ISNAP 116 returns the group number to the ACD 114, which in turn selects a specific operator 122A from this group and establishes a software and voice connection to this operation console 122A. The ACD 114 provides switching functionality between the manual operator console 122A that was selected by the ISNAP 116 and the interexchange network 110. The ACD 114 may be implemented using the automated call distributor manufactured by Nortel.

The ISNAP 116 communicates to the manual operator consoles 122 via NSPP on an operator network center (ONC) wide area network (WAN) and two local area networks (LANs) referred to as the ONC LANs/WAN 118. The ONC LANs/WAN 118 provide a connection to the manual operator console 122A and may assist the ISNAP 116 in directing the call to a manual operator console 122A. The ONC LANs/WAN 118 is a transmission medium and provides access to databases that store information used to process calls. The manual operator consoles 122 communicate with the ONC LANs/WAN 118 using NSPP. The ONC LANs/WAN 118 may be implemented with one or more WANs and/or LANs using Ethernet technology, a token ring LAN, or other similar WAN/LAN technology.

The manual operator consoles 122 are computer consoles that receive calls from the ACD 114 and provide the human operator (not shown) with the information to address the debit customer's call. Unfortunately, the information received does not include debit customer account information. The manual operator consoles 122 need access to the SDP 128 in order to obtain debit customer account information.

The SDP 128 stores debit customer account information used for traffic handling, service provisioning, and billing of debit calls. In accordance with the present invention, the manual operator console 122 accesses the SDP 128 via the AINGW 124 and the SDP LAN 126. The AINGW 124 provides protocol conversion between TCP/IP used by the SDP 128 and NSPP used by the manual operator consoles 122. The AINGW 124 includes one or more computer programs with layers that interface with the SDP 128 and the manual operator consoles 122, perform protocol conversion, and monitor other processes. The computer programs of the AINGW 124 will be described in further detail with the reference to FIG. 2 and FIGS. 4–10.

The selected manual operator console 122A uses information received from the SDP 128 to process the call and then releases the call back to the bridging switch 112 via the ACD 114. The bridging switch 112 connects the call to the receiver 134 via a second local exchange network 132. Similar to a first local exchange network 106, a second local exchange network 132 comprises switches and termination equipment within a localized area. The example used in illustrating a first local exchange network 106, a local telephone operating company network such as Bell Atlantic, also applies to a second local exchange network 132.

Figure 2:
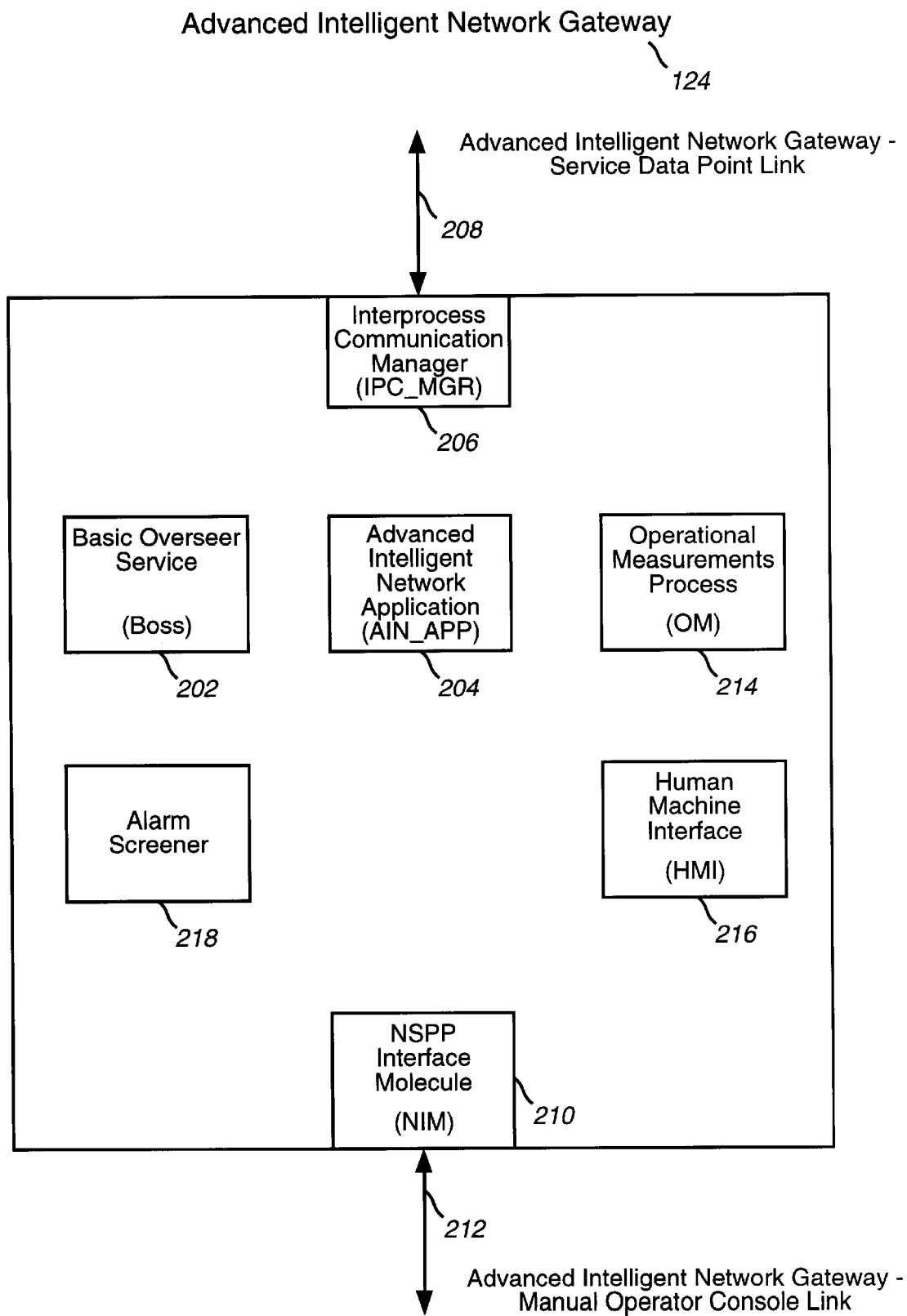
FIG. 2 is a block diagram of the elements of an AINGW in accordance with a preferred embodiment of the present invention.

FIG. 2 is a block diagram of the elements of an AIN of the interface environment 102 of FIG. 1. The computer program layers of the AINGW 124 comprise a basic overseer service (BOSS) 202, an advanced intelligent network application (AIN_APP) 204, an interprocess communications manager (IPC_MGR) 206, a NSPP interface layer (NIM) 210, an operational measurements process (OM) 214, a human machine interface (HMI) 216, and an alarm screener 218. The IPC_MGR 206 and the NIM 210 provide software interfaces between the AINGW 124 and the SDP 128 and the manual operator consoles 122 respectively. The AIN_APP 204 provides transfer of messages between the IPC_MGR 206 and the NIM 210 and protocol conversion. The BOSS 202, OM 214, and alarm screener 218 provide measurement data, monitoring, and error logging. The HMI allows configuration of entities within the computer programs on the AINGW 124.

The AIN-SDP link 208 and AIN-manual operator console link 212 provide links to the SDP 128 and the manual operator consoles 122 respectively. The AIN-manual operator console link 212 provides a link from the AINGW 124 to the manual operator consoles 122 via the ONC LANs/WAN 118.

The BOSS 202 is responsible for starting, stopping, and monitoring the processes on the AINGW 124. The BOSS 202 is the first process started during the start up of the AINGW 124. Monitoring processes on the AIN is done using heartbeats. In addition, the BOSS 202 accepts commands from the HMI 216 to start or stop the AINGW 124 and commands from the NIM 210 to notify of connectivity problems to the manual operator consoles 122. The BOSS is described further below with reference to FIG. 5.

The AIN_APP 204 is a computer program on the AINGW 124 that interfaces between the manual operator consoles 122 and the SDP 128. The AIN_APP 204 interfaces with the manual operator consoles 122 and SDP 128 by communicating with the two interface programs, the NIM 210 and the IPC_MGR 206, on the AINGW 124. The AIN_APP 204 interfaces with the manual operator consoles 122 by communicating with the NIM 210 and it interfaces with the SDP 128 by communicating with the IPC_MGR 206.

The AIN_APP 204 communicates with the NIM 210 and the IPC_MGR 206 by receiving and sending transaction capabilities application part (TCAP) messages. A TCAP message is in the same format as the TCAP message defined by the industry standard format for TCAP messaging for using with Signaling System Number 7 (SS7) protocol. However, unlike the industry standard, TCAP messages are used with various protocols and are not limited to use with SS7. The current industry standard is published in the International Telecommunications Union (ITU) Signaling System Number 7 (SS7) Integrated Services Digital Network (ISDN) User Part (ISUP) NCT 1.113 (1995) document and the International Telecommunications Union (ITU) Signaling System 7 (SS7) Message Transfer Part (MTP) NCT 1.111 (1992) document which are incorporated herein by reference in their entirety. In accordance with the preferred embodiment of the present invention, the TCAP messages received and sent by the AIN_APP 204 include information to process and bill debit calls.

The AIN_APP 204 receives TCAP messages from the manual operator consoles 122 and sends the TCAP messages to the SDP 128. When the AIN_APP 204 receives a reply from the SDP 128, the AIN_APP 204 sends the reply to the manual operator consoles 122. In order to send the TCAP messages between the manual operator consoles 122 and the SDP 128, the AIN_APP 204 converts between TCP/IP and NSPP.

The AIN_APP 204 includes software layers that receive, send, and perform protocol conversion. Within the AIN_APP process, a transaction capabilities application part receive (TCAP_RECV) layer receives TCAP messages from both the manual operator consoles 122 via the NIM 210 and from the SDP 128 via the IPC_MGR 206. Within the AIN_APP process, a transaction capabilities application part send (TCAP_SEND) layer sends messages to both the manual operator consoles 122 via the NIM 210 and to the SDP 128 via the IPC_MGR 206. An advanced intelligent network process message NIM (AIN_PROCESS_MSG_NIM) layer and an advanced intelligent network process message IPC (AIN_PROCESS_MSG_IPC) layer perform protocol conversion. The AIN_APP is described further in FIGS. 5 and 7–13.

The TCAP messaging is encoded in abstract syntax notation (ASN.1). Abstract syntax notation is a generic computer programming language that can be used to write message definitions for products that will reside on various platforms. The abstract syntax notation used to encode the transaction capabilities application part (TCAP) message complies with the industry standard 2.07 and 2.08 established by the Consultative Committee on International Telegraph and Telephone which is the standards-setting committee of the International Telecommunications Union (ITU).

The AIN_APP 204 communicates to the SDP 128 via the IPC_MGR 206. The IPC_MGR 206 is a TCP/IP interface. In accordance with the preferred embodiment of the present invention, the IPC_MGR 206 allows communication with the SDP 128. The IPC_MGR 206 is referred to as a transport mechanism application because it is the mechanism which processes use to transport messages. The IPC_MGR 206 is described further in U.S. patent application Ser. No. 08/671,027 entitled, "System and Method for Interprocess Communication" filed on Jun. 25, 1996 which is incorporated by reference herein in its entirety.

Communication protocols, such as TCP/IP, provide connectivity for communication between two networked nodes. Examples of TCP/IP implementations include Multinet, a computer program produced by TGV, Inc. and UCX, a computer program by Digital Equipment Corporation.

The IPC_MGR 206 communicates to the SDP 128 via an AIN-SDP link 208. The AIN-SDP link 208 connects the AINGW 124 to the SDP 128 via the SDP LAN 126.

The AIN_APP 204 communicates to the manual operator consoles 122 via the NIM 210. The NIM 210 is a NSPP client and server that runs on the AINGW 124. NSPP is a session oriented, guaranteed delivery, communication protocol. NSPP is implemented on top of UDP/IP, used by the manual operator consoles 122, to provide faster communication for call processing. Although the NIM may interface with computer programs by functioning as both a client and a server, in the preferred embodiment of the present invention, the NIM 210 is a server. The NIM is also referred to as a transport mechanism application because it transports messages between applications. The NIM is described in further detail in U.S. patent application Ser. No. 08/672,139 entitled, "A Communication Gateway" filed on Jun. 27, 1996 which is incorporated by reference herein in its entirety.

The NIM 210 communicates to the manual operator service consoles 122 via an AIN-manual operator console link 212. The AIN-manual operator console link 212 connects the AINGW 124 to the manual operator consoles 122 via the ONC LANs/WAN 118.

The OM 214 collects call data from the AIN_APP on the AINGW 124. The OM uploads this data, via NIM, to mainframe for further analysis.

The HMI 216 provides access via a series of software menus which allow the configuration, addition, or deletion of configurable entities within the computer programs on the AINGW 124.

The alarm screener 218 accepts alarms from the other processes on the AINGW 124. The alarms are logged into an alarms log file and receive alarm treatment Alarm treatment consists of thresholding and screening the alarms so the alarms can be processed by other computer programs on the computer system network.

Figure 3:
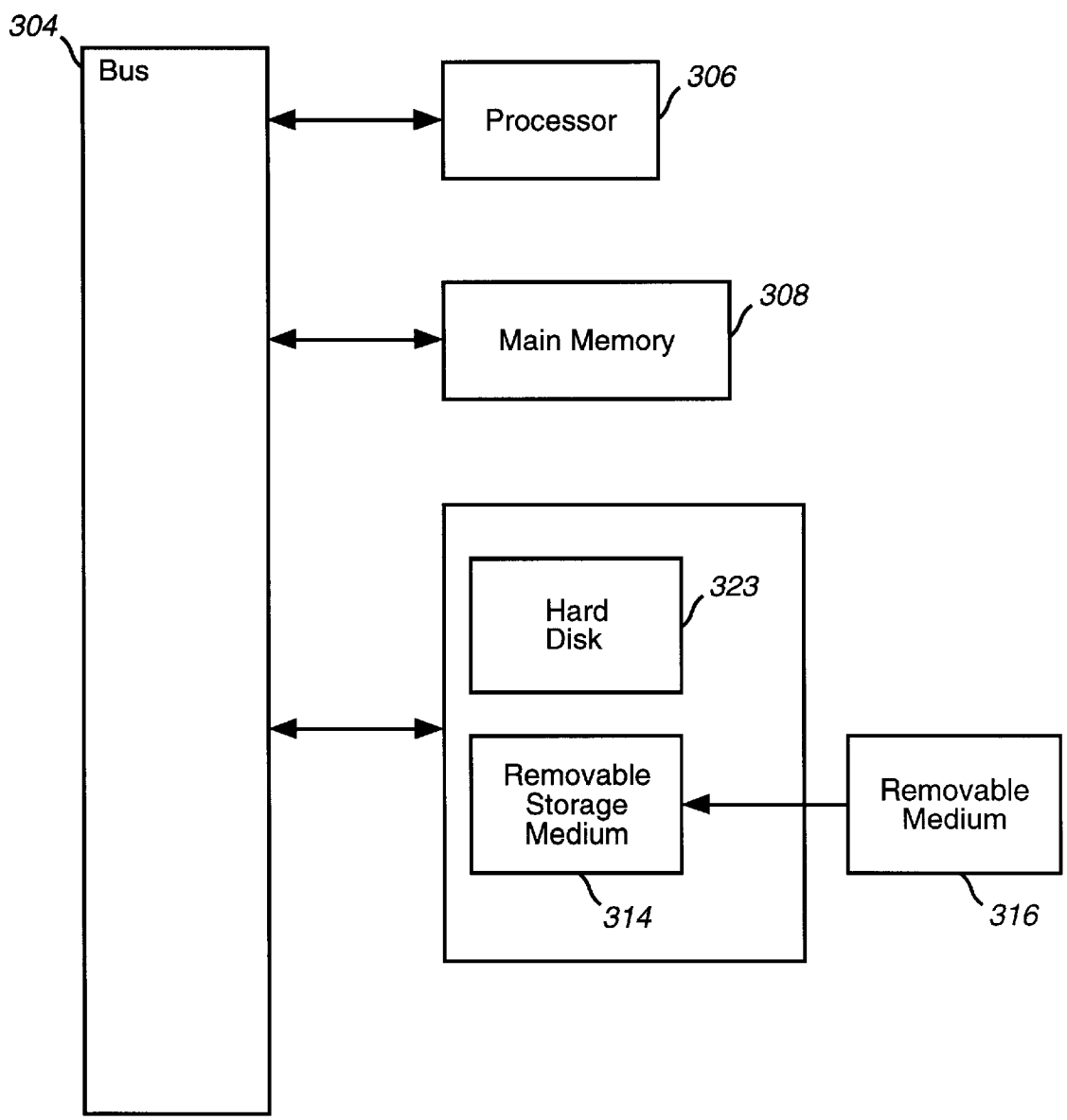
FIG. 3 is a block diagram of the structure of an AINGW in accordance with a preferred embodiment of the present invention.

The AINGW 124 of the present invention is preferably implemented using a computer system as shown in block diagram form in FIG. 3. The computer system includes one or more processors, such as processor 306 connected to bus 304. In a preferred embodiment of the present invention, the AINGW 124 is a DEC Alpha server 1000 with one central processing unit (CPU) operating at 266 megahertz (MHZ). Also connected to bus 304 is main memory 308 (preferably random access memory, RAM) and secondary storage devices 310. In a preferred embodiment of the present invention, the secondary storage devices 310 include, for example, a hard drive 312 and a removable storage medium drive 314 (such as a disk drive, for example).

The AIN_APP 204 is preferably a computer program that resides in main memory 308 while executing. When executing, this computer program enables the AINGW 124 to perform the features of the present invention as discussed herein. Thus, the AIN_APP 204 represents a controller of the AINGW 124 (and of the processor 306).

In one embodiment, the present invention is a computer program product (such as removable storage medium 316, representing a computer storage disk, compact disk, etc.) comprising a computer readable media having control logic recorded thereon. The control logic, when loaded into main memory 308 and executed by processor 306, enables the processor 306 to perform the operations described herein.

Figure 4:
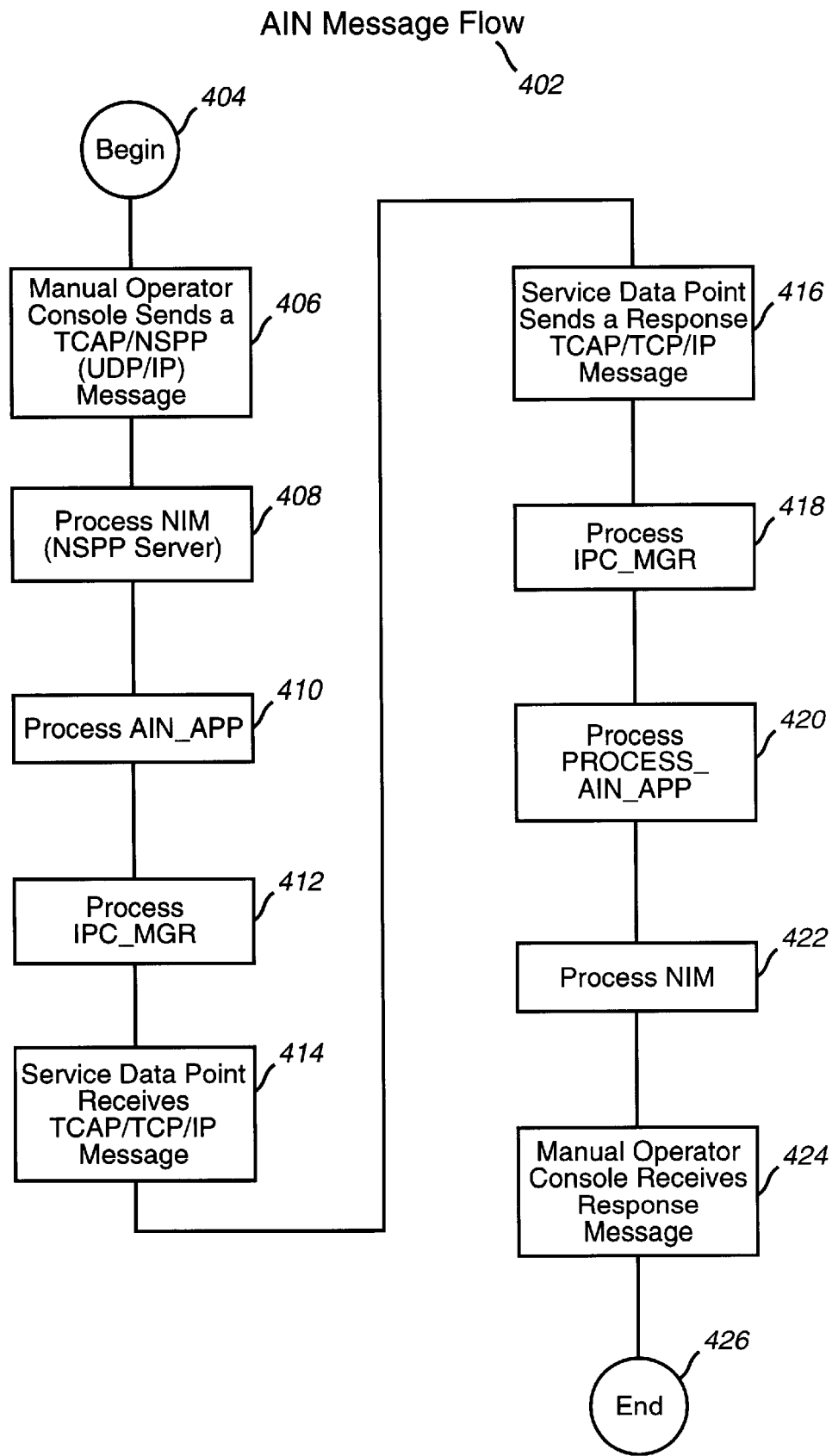
FIG. 4 illustrates the AINGW message flow according to a preferred embodiment of the present invention.

FIG. 4 illustrates the message flow involving an AINGW 124. The message flow is described with respect to an exemplary call being handled by a manual operator console 122A. The message flow begins with the manual operator console 122A sending a TCAP message to the SDP 128 via the AINGW 124 to obtain information needed to process and bill a debit customer's call. The SDP 128 provides the information in the TCAP message, also referred to as a response TCAP message, responding to the manual operator console 122A also via the AINGW 124.

As shown in FIG. 2, several computer programs reside on the AINGW 124. The programs that provide message transfer between the manual operator console 122A and the SDP 128 are the network interface module service (NIMSYS) which is a computer program associated with the NIM 210, the AIN_APP 204, and the IPC_MGR 206. NIMSYS receives the message sent by manual operator console 122A and sends the message to the AIN_APP 204 for protocol conversion. The AIN_APP 204 sends the message to the SDP 128 via the IPC_MGR 206. When the SDP 128 responds, the IPC_MGR 206 receives the message. The IPC_MGR 206 sends the message to the AIN_APP 204 for protocol conversion. The AIN_APP 204 sends the message to manual operator console 122A via NIMSYS.

In step 406, the manual operator console 122A sends a TCAP/NSPP (UDP/IP) message. The TCAP message sent by the manual operator console 122A is in NSPP (UDP/IP) compatible format because the manual operator consoles 122 and operator network center LANs/WAN communicate using NSPP over UDP/IP.

In step 408, NIM receives the NSPP packet. The NIM transfers the message to the AIN_APP service. NIM is described in further detail in U.S. patent application Ser. No. 08/672,139 entitled, "A Communication Gateway" referenced above.

In step 410, the AIN_APP 204 processes the TCAP message. The AIN_APP 204 transfers the message from the NIM to the IPC_MGR and provides protocol conversion from NSPP (UDP/IP) protocol to TCP/IP. The AIN_APP 204 is described in further detail with respect to FIGS. 5–13. Step 410 corresponds to steps 508–512 of FIG. 5.

In step 412, the IPC_MGR receives the message from AIN_APP 204. The IPC_MGR 206 transports the message from the AIN_APP 204 to the SDP 128. The processing performed by the IPC_MGR 206 is described in further detail in U.S. patent application Ser. No. 08/671,027 entitled, "System and Method for Inter-process Communication" referenced above.

In step 414, the SDP 128 receives the TCAP/TCP/IP message. The TCAP message received by the SDP 128 is compatible with TCP/IP.

In step 416, the SDP 128 sends a response TCAP/TCP/IP message.

In step 418, the IPC_MGR 206 receives the message from the SDP 128. The IPC_MGR 206 transports the message from the SDP 128 to the AIN_APP 204. The processing performed by the IPC_MGR 206 is described in further detail in U.S. patent application Ser. No. 08/671,027 entitled, "System and Method for Inter-process Communication" referenced above.

In step 420, the AIN_APP 204 receives and processes the message. The AIN_APP 204 transfers the message from the IPC_MGR 206 to the NIM and provides protocol conversion from TCP/IP to NSPP (UDP/IP). The AIN_APP 204 is described in further detail with respect to FIGS. 5–13. Step 410 corresponds to steps 518–522 of FIG. 5.

In step 422, the NIM receives the message from AIN_APP 204. NIM processing is described in further detail in U.S. patent application Ser. No. 08/672,139 entitled, "A Communication Gateway" referenced above.

In step 424, the manual operator console 122A receives the message. The response message received by the manual operator console 122A is in NSPP (UDP/IP) format.

Figure 5:
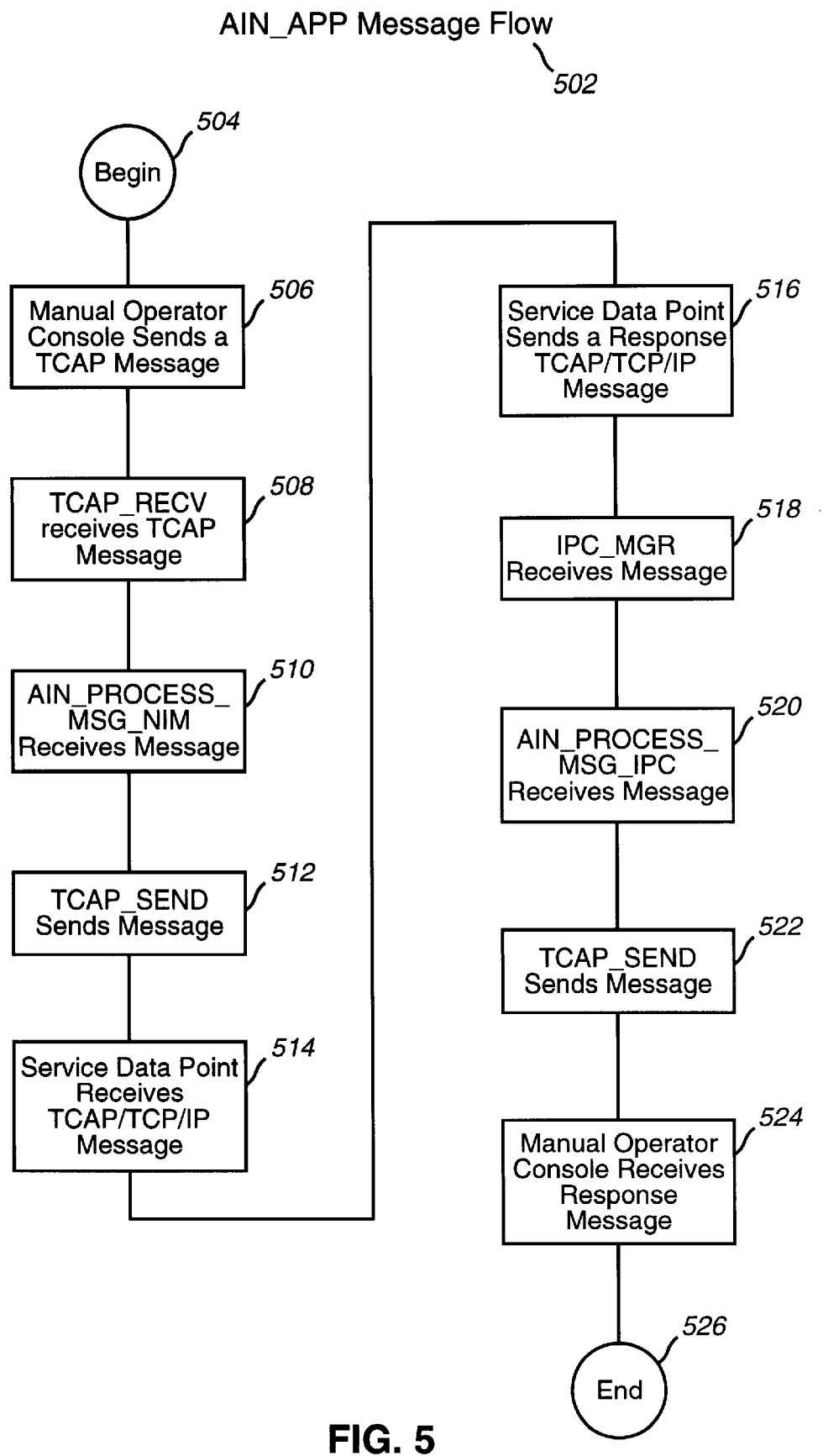
FIG. 5 illustrates the advanced intelligent network application (AIN_APP) message flow according to the preferred embodiment of the present invention.

FIG. 5 illustrates the message flow within the AIN_APP. Several software layers of the AIN_APP, mentioned previously in the description of FIG. 2, receive, send, and perform protocol conversion. The TCAP_RECV layer acts as a single interface for receiving TCAP messages. The TCAP_RECV layer receives both the initial TCAP message from the manual operator console 122A and the reply TCAP message from the SDP 128. The TCAP_SEND layer acts as a single interface for sending TCAP messages. The TCAP_SEND layer sends both the initial TCAP message to the SDP 128 and the reply message to the manual operator console 122A. The AIN_PROCESS_MSG_NIM layer performs protocol conversion for the initial TCAP message sent from the manual operator console 122A to the SDP 128. The AIN_PROCESS_MSG_IPC layer performs protocol conversion for the response TCAP message from the SDP 128 to the manual operator console 122A.

In step 506, the manual operator console 122 sends a TCAP message to the AINGW 124. The TCAP message complies with the ITU TCAP standard referenced above. In order to describe how information is passed between the manual operator console 122A and the SDP 128, a description of the TCAP message is provided below. In the preferred embodiment of the present invention, the fields of the TCAP message are used either to assist in the transaction of the message or to pass other information, such as debit customer account information, between the manual operator console 122A and the SDP 128.

The TCAP message includes two portions: a transaction portion and a component portion. The transaction portion is used to assist in sending the message between the manual operator console 122A and the SDP 128. The transaction portion indicates the message type and provides information identifying the message and the component portion. The transaction portion and the component portion are described in Table 1 below. The transaction portion is described in more detail in Table 2 following Table 1.

TABLE 1

Transaction Capabilities Application Part Message

| Field | Usage |
| --- | --- |
| Transaction Portion | Indicates the type of message and the network elements that will receive the message. |
| Component Portion | Indicates the operation to be performed, provides parameters that can be specified on a product-by-product basis, and provides a response to the message transfer. |

TABLE 2

Transaction Portion of the Transaction Capabilities Application Part Message

| Field | Usage |
| --- | --- |
| Message Type Tag | Indicates the type of transaction. The five types are begin, end, continue, abort, and unidirectional. |
| Total TCAP Message Length | Indicates the total length of the TCAP message. |
| Transaction Portion Information Element | Comprises a transaction identifier and transaction identifier length. A transaction identifier permits transaction association. A transaction identifier length indicates the total length of the transaction identifier. |
| Component Portion Tag | Indicates that the component portion of the TCAP message follows. |
| Component Portion Length | Indicates the total length of the component portion. |

At the beginning of a transaction, the manual operator console 122 sends a begin type TCAP message which requires a response be returned. The type of message is indicated in the first field of the message as shown in Table 2. The possible message type tags are described in further detail in Table 3 below. In addition, Table 3 provides the appropriate transaction identifier for each message type tag.

TABLE 3

Message Type Definition and Association with Transaction Identifier

| Message Type Tag | Use of Message Type Tag | Transaction Identifier |
| --- | --- | --- |
| Begin | Indicates the beginning of a transaction and the need to return a response. | An originating transaction identifier is included in the message. |
| End | Indicates the response to a query and an end to the transaction. | A destination transaction identifier is included in the message. |
| Continue | A response to a query, with a prearranged timeout. | Both originating and destination transaction identifiers are included in the message. |
| Abort | Indicates an abrupt termination of the transaction. | A destination transaction identifier is included in the message. |
| Unidirectional | A message sent without a response. | A destination transaction identifier is included in the message. |

In addition to a transaction portion, the transaction capabilities message also includes a component portion. The component portion may be one of the following types: invoke, return result last, return result not last, return error, or reject. In begin, end, unidirectional, and continue type messages, the component portion includes information to assist in sending the message. In addition, the component portion of the end type or continue type response messages includes the information needed by the manual operator console 122A. Further detail on the component portion is given in Table 4 below.

TABLE 4

Component Portion of the Transaction Capabilities Application Part Message

| Field | Usage |
| --- | --- |
| Invoke Component | Indicates the operation to be performed and, in the preferred embodiment of the present invention, parameters needed to perform the operation. |
| Return Result Last | Indicates that a transaction completed successfully. Includes a component type tag and an invoke identifier tag. May also include a sequence tag and an operation and code tag. In the preferred embodiment of the present invention, parameters are included in a parameters field that provide information about the debit customer's account. A sequence tag is used when there is more than one parameter in a component. It is followed by sequence length. |
| Return Result Not Last | Indicates a response without a completion of the transaction. Includes a component type tag and an invoke identifier tag. May also include a sequence tag and an operation and code tag. In the preferred embodiment of the present invention, parameters are included in a parameters field that provide routing and billing information. A sequence tag is used when there is more than one parameter in a component. It is followed by sequence length. |
| Return Error Component | Indicates either that invalid information was transmitted or a system failure exists that prohibits call set-up. Includes a component type tag and an invoke identifier tag. May also include a parameters field. |
| Reject Component | Indicates a protocol error such as a missing parameter. Includes a component type tag, an invoke identifier tag, a problem code tag, and a parameter field. A problem code is preceded by a problem code tag and a problem code length. A problem code may be one of the four following types: a general problem, a return result problem, and a return error problem. |

Because a begin type TCAP message is sent from the manual operator console 122A, the component portion comprises an invoke component. The invoke component includes the operation to be performed and parameters defined on a message-by-message basis. More information on the query or invoke component is given in Table 5 below.

TABLE 5

Invoke Component

| Field | Usage |
| --- | --- |
| Component Type Tag | Indicates the type of component. |
| Invoke Identifier | Invoke identifiers are used to distinguish between multiple components within a single transaction. The invoke identifier is preceded by an invoke identifier tag and an invoke identifier length. |
| Linked Identifier Tag | Links multiple transactions. Preceded by a link identifier tag and link identifier link. |
| Operation Code | Identifies the operation to be performed. The operation code is preceded by an operation code tag and an operation code length. |
| Parameter Contents | Parameters defined on a message-by-message basis. Parameter contents are preceded by the parameter tag and parameter length. |

The parameters contents field shown in Table 5 in the query or invoke component of the TCAP message contains parameters that are defined on a message-by-message basis.

In a request message, the parameter contents field contains the data necessary for the SDP 128 to access the customer's debit account. In a response, the parameter contents field contains the status of the customer's account.

In step 508, the TCAP_RECV layer within the AIN_APP is executed. The TCAP_RECV layer determines which transport mechanism application sent the TCAP message. In other words, the TCAP_RECV layer determines whether the TCAP message is received via the NIM 210 from the manual operator console 122 or via the IPC_MGR 206 from the SDP 128. When the message is sent from the manual operator console 122A, the TCAP_RECV layer will determine that the message is received from the NIM 210. When the TCAP_RECV layer determines the source of the message, it processes the corresponding decoding and constructing layer. The decoding and constructing layers are the AIN_PROCESS_MSG_NIM layer and the AIN_PROCESS_MSG_IPC layer. The TCAP_RECV layer is described in further detail with reference to FIG. 11. The AIN_PROCESS_MSG_NIM layer is described further with reference to FIG. 8. The AIN_PROCESS_MSG_IPC layer is described further with reference to FIG. 10.

In step 510, the AIN_PROCESS_MSG_NIM layer is executed. Similar to TCAP_RECV, the AIN_PROCESS_MSG_NIM layer is within the AIN_APP computer program. The AIN_PROCESS_MSG_NIM layer decodes the TCAP message and stores the information from the message in an array. The AIN_PROCESS_MSG_NIM layer populates a dialog identifier which identifies the element in the array where the information was stored. The AIN_PROCESS_MSG_NIM layer is described in further detail with reference to FIG. 8.

In step 512, the TCAP_SEND layer is executed. The TCAP_SEND layer is also within the AIN_APP. The TCAP_SEND layer determines which transport mechanism application will receive the TCAP message. In other words, TCAP_SEND determines whether to send the TCAP message via the NIM 210 to the manual operator console 122 or via the IPC_MGR 206 to the SDP 128. Accordingly, when the message is received from the manual operator console 122, the TCAP_SEND layer forwards the message to the SDP 128 via the IPC_MGR 206. After TCAP_SEND determines the recipient of the message, it processes the corresponding decoding and constructing layer. The TCAP_SEND layer is described in further detail with reference to FIG. 12.

In step 514, the SDP 128 receives the TCAP message. The SDP 128 is a computer system that includes a database that stores debit customer account information. For typical debit calls, the SDP 128 is accessed by the SSCP 130. The SSCP 130 provides automated menus that allow the debit customer to select options and provide information to process the call.

However, when the debit customer wishes to use customer services, the call must be routed to one of the manual operator consoles 122 which use NSPP (UDP/IP) protocol. The manual operator consoles 122 request debit customer information required for processing the call from the SDP 128 as occurs with call processing via the SSCP 130. Unlike call processing via the SSCP 130, the call is routed via the AIN because protocol conversion is needed. Similar to call processing with the SSCP 130, the SDP 128 processes the TCAP message using stored debit customer account information.

In step 516, the SDP 128 sends a response TCAP message. The response is a continue type TCAP message. Like the begin type TCAP message, the continue type TCAP message comprises a transaction portion and a component portion which are described in further detail in Table 1 above. Unlike the begin type TCAP message, the continue type TCAP message has a continue type message type tag. Further detail on message type tags is given in Table 3 above.

The SDP 128 stores the customer account information in the component portion of the response TCAP message shown in Table 4 above. The component portion of a successful continue type TCAP message comprises a return result component.

TABLE 6

Return Result Component

| Field | Usage |
| --- | --- |
| Component Type Tag | Indicates the type of component. |
| Invoke Identifier | Invoke identifiers are used to distinguish between multiple components within a single transaction. The invoke identifier is preceded by an invoke identifier tag and an invoke identifier length. |
| Operation Code | Identifies the operation to be performed. The operation code is preceded by an operation code tag and an operation code length. |
| Sequence Tag | May be used to provide information about the component sequence. |
| Parameter Contents | Parameters defined on a message-by-message basis. Parameter contents are preceded by the parameter tag and parameter length |

The parameters field of the return result component of the continue type TCAP message shown in Table 6 is used to transmit the customer account information. The parameter field shown in Table 6 is in the same format of the more detailed description of the parameter field that was discussed with respect to the invoke component of the begin type TCAP message. The SDP 128 populates the information into the parameter contents field.

In step 518, the TCAP_RECV layer is executed. The TCAP_RECV layer is the same layer that is processed in step 508 when the begin type TCAP message is sent from the manual operator console 122. Similar to the processing of the begin type TCAP message, the TCAP_RECV layer determines which transport mechanism application sent the TCAP message. In other words, the TCAP_RECV layer determines whether the TCAP message is received via the NIM 210 from the manual operator console 122 or via the IPC_MGR 206 from the SDP 128. In step 518, the message is received from the SDP 128, therefore, the TCAP_RECV layer will determine that the TCAP message was received from the IPC_MGR 206. When the TCAP_RECV layer determines the source of the message, it processes the corresponding decoding and constructing layer. The TCAP_RECV layer is described in further detail with reference to FIG. 11.

In step 520, the AIN_PROCESS_MSG_IPC layer is executed. Similar to other layers described above, the AIN_PROCESS_MSG_IPC layer is also within the AIN_APP computer program. The AIN_PROCESS_MSG_IPC layer decodes the TCAP message and retrieves the information stored in the array during step 510. The AIN_PROCESS_MSG_IPC layer retrieves the dialog identifier from the message received from the SDP 128. The dialog identifier is used to identify the element in the array that was used to store the information during step 510. The AIN_PROCESS_MSG_IPC layer uses the dialog identifier to retrieve the information stored in the dialog array. The AIN_PROCESS_MSG_IPC layer populates the stored information into the TCAP message. The AIN_PROCESS_MSG_IPC layer is described in further detail with reference to FIG. 10.

In step 522, the TCAP_SEND layer is executed. The TCAP_SEND layer is the same layer that is processed in step 512 when the begin type TCAP message is sent from the manual operator console 122 to the SDP 128. Similar to the processing of the begin type TCAP message, TCAP_SEND determines which transport mechanism application will receive the TCAP message. In other words, TCAP_SEND determines whether to send the TCAP message via the NIM 210 to the manual operator console 122 or via the IPC_MGR 206 to the SDP 128. Accordingly, when the message is received from the SDP 128 with the information requested, the TCAP_SEND layer determines that the message is being sent to the NIM 210 to provide the information to the manual operator console 122. When TCAP_SEND determines the recipient of the message, it processes the corresponding decoding and constructing layer. The TCAP_SEND layer is described in further detail with reference to FIG. 12.

In step 524, the manual operator console 122A receives the continue type TCAP message. The manual operator console 122A retrieves the information from the parameter contents field of the TCAP message and provides the human operator with information needed to process the debit call.

Figure 6:
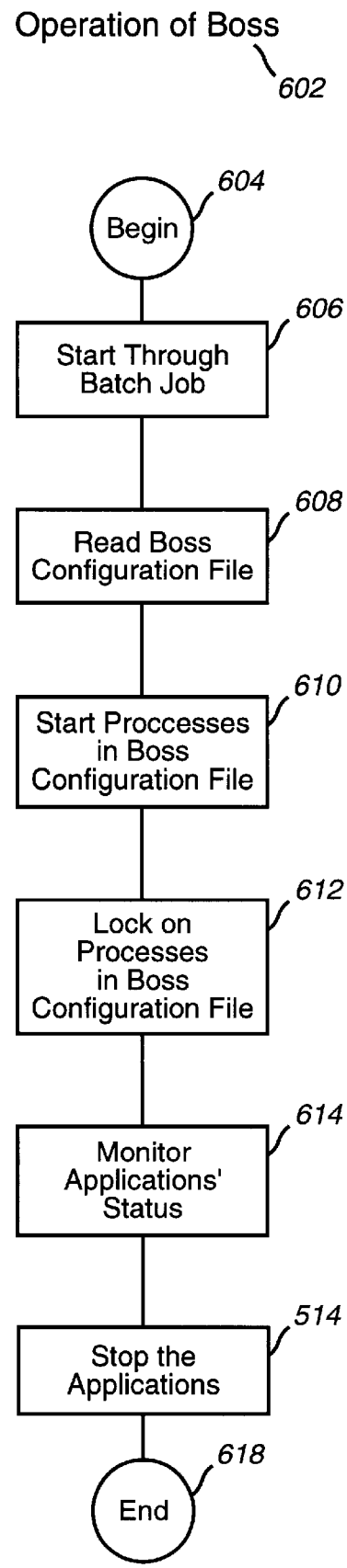
FIG. 6 illustrates the operation of a basic overseer service (BOSS) of the AINGW of FIGS. 2 and 3 according to a preferred embodiment of the present invention.

FIG. 6 is a flowchart 602 which illustrates the operation of BOSS 202. The BOSS 202 is responsible for starting, stopping, and monitoring the processes on the AINGW 124. The BOSS 202 process is the first process called during start up of the AINGW 124.

In step 606, BOSS 202 starts through the batch process. The batch process submits batch jobs that include command procedures that initiate BOSS 202 and enable BOSS 202 to begin processing.

In step 608, BOSS 202 reads the BOSS configuration file. The BOSS configuration file contains identifiers for each process to be started by BOSS 202 along with other information about the processes.

In step 610, BOSS 202 starts the processes in the BOSS configuration file. In this embodiment, the BOSS configuration file will call the IPC_MGR 206, the alarm screener 218, the NIM 210, and the AIN_APP 204. During start-up, each process initializes communication with BOSS 202, performs internal initialization, and sends an initialization complete message back to BOSS 202. BOSS 202 starts the processes in the order they are specified in the configuration file.

The IPC_MGR 206 is responsible for monitoring BOSS 202. Therefore, the IPC_MGR 206 is the first process that BOSS 202 starts. If BOSS 202 malfunctions, the IPC_MGR 206 controls and restarts BOSS 202.

In step 612, BOSS 202 establishes a lock on each process that was started. The lock will allow BOSS 202 to be notified if a process terminates.

In step 614, BOSS monitors applications' status. BOSS 202 monitors specified processes referred to as heartbeat processes. The BOSS configuration file has a heartbeat flag, which when set to Y, will cause BOSS 202 to monitor the flagged or heartbeat process. To monitor a process, BOSS 202 sends a heartbeat, starts a timer, and waits for a response. If a response is not received from the process within the time-out period, BOSS 202 will stop and restart the process. If other processes are interdependent on the malfunctioning process, BOSS 202 will stop the other processes, restart the malfunctioned process, and then restart the other processes. In this embodiment, the heartbeat processes comprise the IPC_MGR 206, the alarm screener 218, the NIM 210, the AIN_APP 204, and the OM 214. The HMI 216 is not monitored by heartbeats.

In step 616, BOSS 202 stops the applications. BOSS 202 stops the applications before the AINGW 124 system shuts down and is only on command from the HMI 216.

Figure 7:
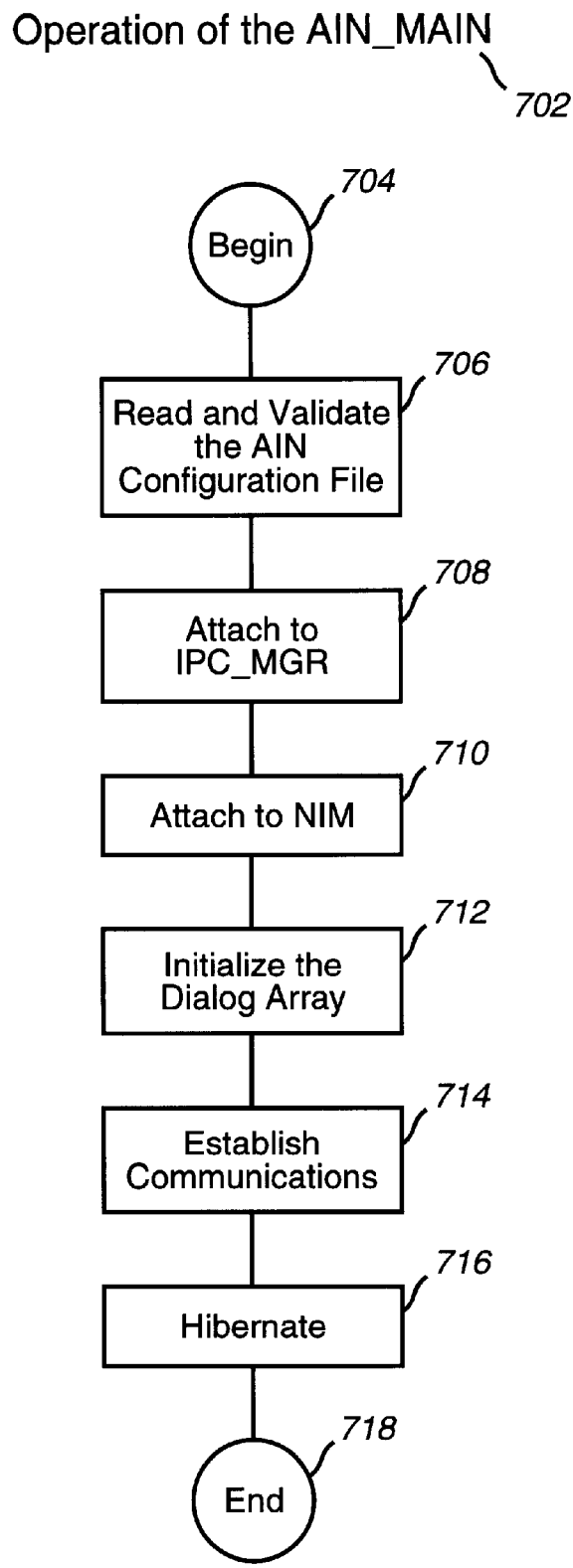
FIG. 7 illustrates the operation of the main routine of the AIN_APP program residing in the main memory of the AINGW of FIGS. 2 and 3 according to a preferred embodiment of the present invention.

FIG. 7 is a flowchart 702 which illustrates the operation of the AIN_MAIN, advanced intelligent network main layer. AIN_MAIN is the layer that is first processed when the AIN_APP 204 is started by BOSS 202. AIN_MAIN establishes interconnections between the IPC_MGR 206 and the NIM 210 which allows the AIN_APP 204 to perform its function as interface between the manual operator consoles 122 and the SDP 128.

In step 706, the AIN_MAIN reads and validates the advanced intelligent network (AIN) configuration file. The AIN configuration file contains the information needed to establish connection with the SDP 128. In another embodiment of the present invention, the network contains more than one SDP 128. In that embodiment, the AIN configuration file contains the information needed to establish connections with all of the SDPs 128. More particularly, the AIN configuration file comprises the number of SDPs 128 and for each SDP 128, a unique SDP identifier, referred to as a server key, the protocol to be used in communicating with the SDP 128, such as TCP/IP, and the internet protocol addresses for each SDP 128. The internet protocol address is an address on the SDP 128 identifying a point to interconnect and access information. Typically a SDP 128 has three internet protocol addresses.

In step 708, AIN_MAIN attaches to the IPC_MGR 206. AIN_MAIN establishes an interconnection between the AIN_APP 204 and the IPC_MGR 206. AIN_APP then tells the IPC_MGR to establish TCP connections to the IP addresses read in from the configuration file. That allows the AINGW to communicate with the SDP 128.

In step 710, the AIN_MAIN attaches to the NIM 210. When the AIN_MAIN attaches to the NIM 210, NIM announces to the manual operator consoles 122 that customer service for debit customers is available.

In step 712, the AIN_MAIN initializes the dialog array. The dialog array is an array that can handle 1024 messages in a particular process. The dialog array stores information about the transaction as the transaction is taking place. The AIN_MAIN stores a dialog identifier in the transaction capabilities message during the transaction. The dialog identifier is used to retrieve the information stored in the dialog array later during the transaction and points to the corresponding element in the array.

In step 714, the AIN_MAIN routine establishes communications. The AIN_MAIN routine calls the IPC_MGR 206 to establish communications. The AIN_MAIN routine establishes communications with NIM 210 after it has established TCP connections with the SDP 128 via the IPC_MGR 206.

In step 714, the AIN_MAIN hibernates and waits for a request to be received from the NIM 210.

Figure 8:
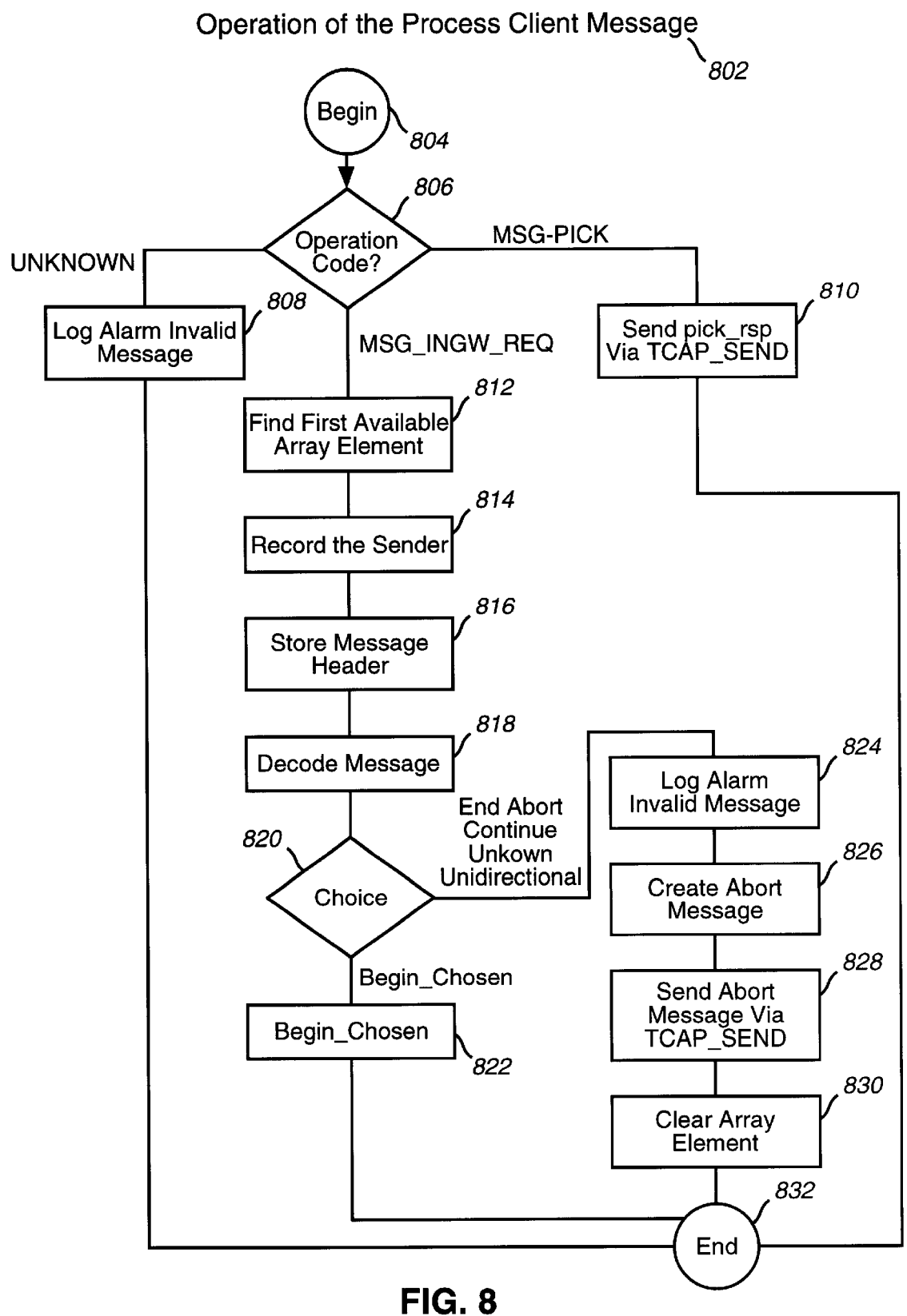
FIG. 8 illustrates the operation of an advanced intelligent network process message NIM (AIN_PROCESS_MSG_NIM) module of the AIN_APP residing in the AINGW of FIGS. 2 and 3 according to a preferred embodiment of the present invention.

FIG. 8 is a flowchart 802 which illustrates the operation of the process client message (AIN_PROCESS_MSG_NIM) layer. The AIN_PROCESS_MSG_NIM layer receives messages from the manual operator console 122A via the NIM 210 and the TCAP_RECV layer of the AIN_APP 204.

In step 806, the AIN_PROCESS_MSG_NIM layer determines the operation code that was sent. An operation code, which is one of the operation codes defined by NSPP, is sent by the NIM 210. The three possible operation codes that may be sent by NIM 210 include UNKNOWN, MSG_INGW_REQ, and MSG_PICK.

Each of the operation codes causes the AIN_PROCESS_MSG_NIM layer to perform a different function. The UNKNOWN operation code is an error message that causes an alarm. The MSG_PICK operation code is used by the manual operator console 122A during start up to establish that the AIN_APP 204 is an available service. The MSG_INGW_REQ operation code is used by the manual operator console 122A to signal that a TCAP message is being sent requesting information from the SDP 128.

If the operation code is UNKNOWN, step 808 is processed. In step 808, the AIN_PROCESS_MSG_NIM layer logs an alarm invalid message. The alarm invalid message is logged via the alarm screener 218. After step 808 is performed, the AIN_PROCESS_MSG_NIM proceeds to step 832.

If the operation code is MSG_PICK, step 810 is processed. In step 810, the AIN_PROCESS_MSG_NIM layer sends a PICK_RSP message to the manual operator console 122A via the TCAP_SEND layer and the NIM 210. The PICK_RSP message indicates that the AIN_APP 204 is an available service. After step 810 is performed, the AIN_PROCESS_MSG_NIM layer proceeds to step 832.

If the operation code is MSG_INGW_REQ, step 812 is performed. Step 812 is the first step in processing the TCAP message sent by the manual operator console 122A requesting information from the SDP 128. In step 812, the AIN_PROCESS_MSG_NIM layer finds the first available array element in the dialog array. The dialog array is an internal array that is used for storing transaction information.

In step 814, the AIN_PROCESS_MSG_NIM layer records the sender. The AIN_APP 204 allows access by many transport mechanism applications. Recording the sender allows the AIN_PROCESS_MSG_NIM to process messages sent by multiple senders. For example, SS7 manual operator consoles may be added to the network and processed by AIN_PROCESS_MSG_NIM. SS7 manual operator consoles are similar to manual operator consoles 122 except that SS7 manual operator consoles use SS7 signaling rather Man NSPP. The AIN_PROCESS_MSG_NIM could be used to process the TCAP messages sent by the SS7 manual operator consoles 122.

In step 816, the AIN_PROCESS_MSG_NIM layer stores the message header. The message header is compatible with NSPP and is stored in the internal array. When a response TCAP message is sent from the SDP 128 to the manual operator console 122A, the AIN_PROCESS_MSG_IPC will retrieve the message header and rebuild the message in NSPP format to respond to the manual operator console 122A.

In step 818, the AIN_PROCESS_MSG_NIM layer decodes the message.

In step 820, the AIN_PROCESS_MSG_NIM layer determines the value of the choice variable. The value of the choice variable determines whether the BEGIN_CHOSEN routine is processed or an alarm logged and abort message sent. The choice variable may be BEGIN_CHOSEN, END, ABORT, CONTINUE, UNKNOWN, and UNIDIRECTIONAL. If the choice variable is BEGIN_CHOSEN, the BEGIN_CHOSEN routine is processed. If the choice variable is END, ABORT, CONTINUE, UNKNOWN, or UNIDIRECTIONAL, the AIN_PROCESS_MSG_NIM will log and alarm and send an abort message.

In step 822, the AIN_PROCESS_MSG_NIM layer calls the BEGIN_CHOSEN routine. The BEGIN_CHOSEN routine validates and converts data, deconstucts the NSPP based TCAP message and reconstructs the TCP/IP based TCAP message. The processing of the BEGIN_CHOSEN routine is described in more detail with reference to FIG. 9. After the BEGIN_CHOSEN routine is processed, the AIN_PROCESS_MSG_NIM proceeds to step 832.

In step 824, the AIN_PROCESS_MSG_NIM layer logs an alarm invalid message. The alarm invalid message is logged via the alarm screener 218.

In step 826, the AIN_PROCESS_MSG_NIM layer creates an abort message. The abort message informs the manual operator console 122A that the request that was sent to the AINGW 124 is invalid.

In step 828, the AIN_PROCESS_MSG_NIM layer sends an abort message via TCAP_SEND to the manual operator console 122A.

In step 830, the AIN_PROCESS_MSG_NIM layer clears the array element. Information no longer needs to be stored in the internal array for a response message from the SDP 128 to the manual operator console 122A because the request sent from the manual operator console 122A to the SDP 128 has been aborted.

In step 832, the operation of the AIN_PROCESS_MSG_NIM is complete and AIN_PROCESS_MSG_NIM hibernates until another message is received.

Figure 9:
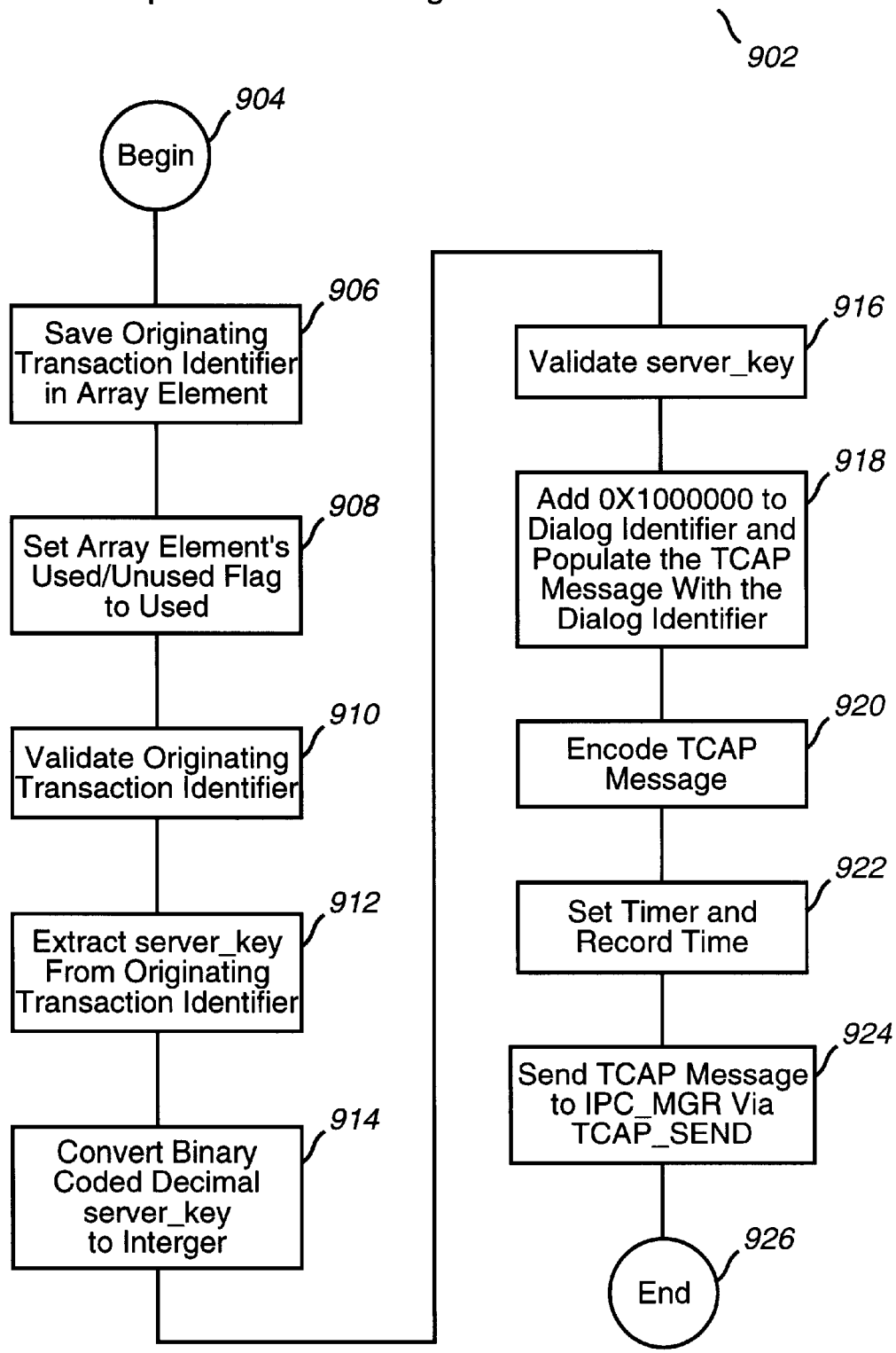
FIG. 9 illustrates the operation of a begin chosen (BEGIN_CHOSEN) routine of the AIN_APP residing in the AINGW of FIGS. 2 and 3 according to a preferred embodiment of the present invention.

FIG. 9 is a flowchart which illustrates the operation of the begin chosen (BEGIN_CHOSEN) routine. In step 906, the BEGIN_CHOSEN routine saves the originating transaction identifier in the free dialog array element found by the AIN_PROCESS_MSG_NIM layer in step 812 of FIG. 8.

The origination transaction identifier field is a field within the transaction portion of the TCAP message as shown in Tables 2 and 3 above. For a begin type TCAP message, the transaction portion contains a transaction portion information element as shown in Table 2. As shown in Table 3, a begin type TCAP message includes an originating transaction identifier in the transaction identifier field of the transaction portion information element of the TCAP message. During the processing of debit customer service calls, the server_key is populated into the first 3 bytes of the origination transaction identifier field.

In step 908, the BEGIN_CHOSEN routine sets the used/unused flag of the element in the dialog array to used. This causes the information from the next message processed to be put in the next dialog array element.

In step 910, the BEGIN_CHOSEN routine validates the originating transaction identifier. The length of the originating transaction identifier is validated to ensure it is 3 bytes.

In step 912, the BEGIN_CHOSEN routine extracts the server key from the originating transaction identifier. The server_key identifies the SDP 128 that will receive the message. The server key is retrieved by the BEGIN_CHOSEN routine from the origination transaction identifier field in the TCAP message.

In step 914, the BEGIN_CHOSEN routine converts the binary coded decimal server_key to an integer. The server_key is stored in a binary coded decimal format of 3 bytes. However, binary decimal coding allows 2 digits to be packed into 1 byte. After the conversion, the server_key will be 6 bytes.

In step 916, the BEGIN_CHOSEN routine validates the server_key. Validating the server_key involves identification of the particular SDP 128 associated with the server_key and then retrieving the internet protocol addresses that are associated with the SDP 128 from the AIN configuration file. The BEGIN_CHOSEN routine verifies that the server_key is contained in the AIN configuration file. If the server_key is contained in the AIN configuration file, it corresponds to a valid SDP 128. The BEGIN_CHOSEN routine retrieves the internet protocol addresses corresponding to the SDP 128 identified by the server_key from the AIN configuration file. Each SDP 128 has multiple internet protocol addresses which are the addresses on the SDP 128 that identify the possible interconnect points for accessing information.

In step 918, the BEGIN_CHOSEN routine adds 0x1000000 to the dialog identifier and populates the TCAP message with the dialog identifier. The BEGIN_CHOSEN routine then populates the dialog identifier in the origination transaction identifier field of the TCAP message. As shown in Table 2, the origination transaction identifier field is in the transaction component of the TCAP message. The origination transaction identifier field no longer contains the server_key as the server_key was removed from the origination transaction identifier field in step 912. The dialog identifier is populated in the originating transaction identifier field of the TCAP message in place of the server_key.

In step 920, the BEGIN_CHOSEN routine encodes the TCAP message. The BEGIN_CHOSEN routine encodes the TCAP message in the industry standard generic computer programming language abstract syntax notation (ASN.1).

In step 922, the BEGIN_CHOSEN routine sets a timer. In the preferred embodiment of the present invention, the timer is set to timeout in three seconds. The timer is configured to ensure that the response message coming from the SDP 128 does not exceed a specified time, such as three seconds in the preferred embodiment of the present invention.

In step 924, the BEGIN_CHOSEN routine sends the TCAP message to the SDP 128 via the IPC_MGR 206 by sending the message to the TCAP_SEND layer of the AIN_APP 204.

Figure 10:
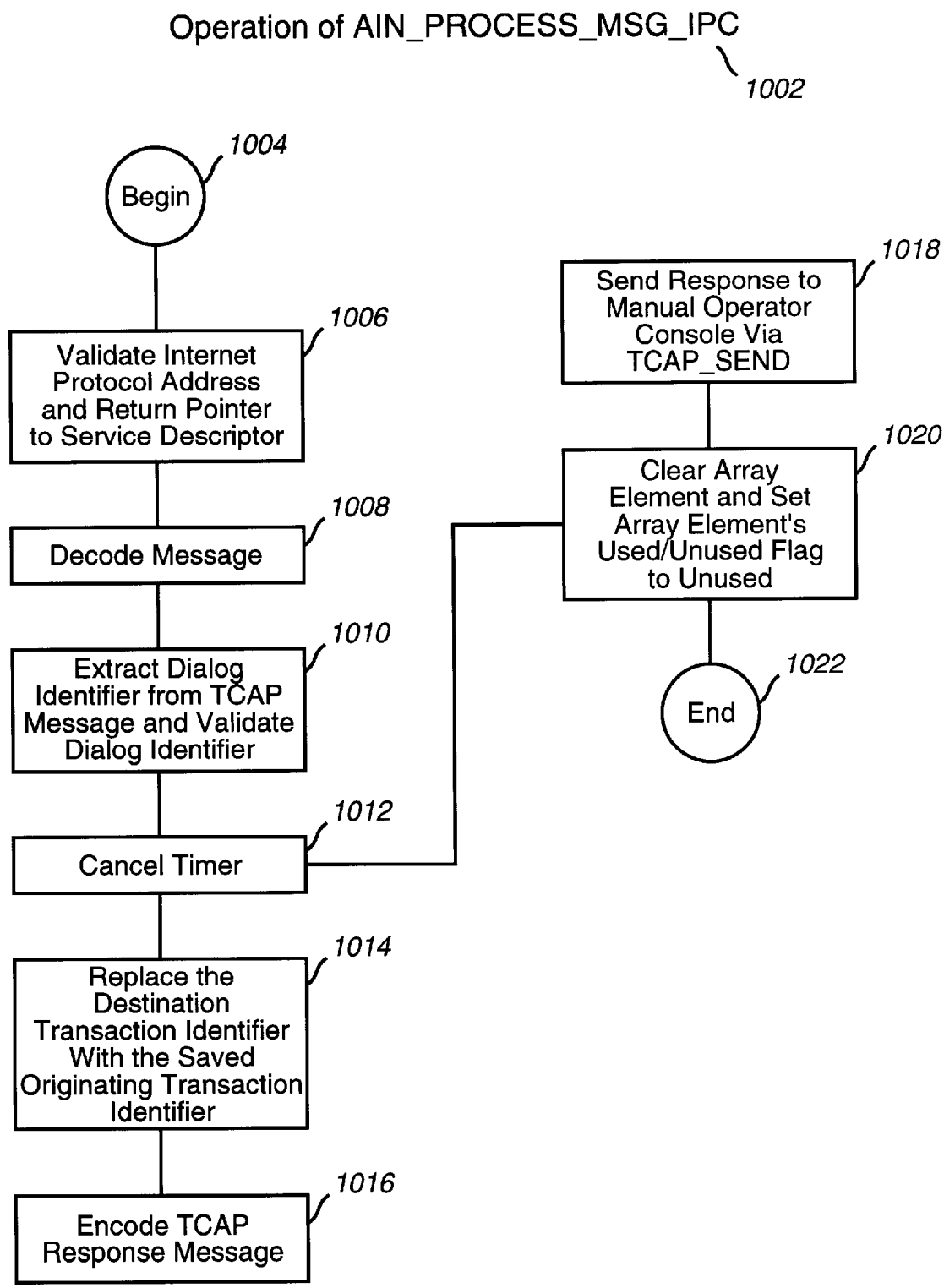
FIG. 10 illustrates the operation of an advanced intelligent network process message IPC (AIN_PROCESS_MSG_IPC) layer of the AIN_APP residing in the AINGW of FIGS. 2 and 3 according to a preferred embodiment of the present invention.

FIG. 10 is a flowchart 1002 which illustrates the operation of the AIN_PROCESS_MSG_IPC layer. The AIN_PROCESS_MSG_IPC layer receives messages from the IPC_MGR 206.

In step 1006, the AIN_PROCESS_MSG_IPC layer validates the internet protocol address and returns the pointer to the service descriptor. The AIN_PROCESS_MSG_IPC layer validates that the internet protocol address corresponds to one of the internet protocol addresses associated with the SDP 128 that sent the TCAP message. The AIN_PROCESS_MSG_IPC layer returns the pointer to the service descriptor which corresponds to a service. Similar to recording the sender which was performed by the AIN_PROCESS_MSG_NIM layer in step 814 of FIG. 8, using a service descriptor allows the AIN_PROCESS_MSG_IPC to process TCAP response messages from multiple services. For example, if a SDP 128 was installed that used SS7 signaling, the AIN_PROCESS_MSG_IPC could process response messages received via the SS7 network. The service descriptor indicates the service that sent the response message, such as the SDP 128.

In step 1008, the AIN_PROCESS_MSG_IPC layer decodes the message using the ASN.1 decoder which returns the decoded message to a structured buffer. Thus, the application can access the individual parameters of the message. The abstract syntax notation (ASN.1) encoding performed in step 920 of FIG. 9 is decoded.

In step 1010, the AIN_PROCESS_MSG_IPC layer extracts the dialog identifier from the TCAP message. In step 918 of FIG. 9, the AIN_PROCESS_MSG_NIM layer stored the dialog identifier in the origination transaction identifier field of the transaction portion of the TCAP message. Because the response message has continue arranged, the TCAP message includes both originating and destination transaction identifiers as shown in Table 3 above. The dialog identifier is stored in the destination transaction identifier field in the response TCAP message sent from the SDP 128. The transaction portion of the continue TCAP message is shown in more detail in Table 2 above.

In addition, the AIN_PROCESS_MSG_IPC layer validates the dialog identifier. The AIN_PROCESS_MSG_IPC layer validates that the dialog identifier is within bounds. In other words, if the internal array has 2000 elements, the AIN_PROCESS_MSG_IPC validates that the dialog identifier corresponds to an element between 0 and 1999.

The AIN_PROCESS_MSG IPC layer also validates the dialog identifier by ensuring that the used/unused flag of the element in the array corresponding to the dialog identifier is set to used. Validating that the used/unused flag of the element corresponding to the dialog identifier is set to used ensures that a TCAP response is not created for a response that was delayed beyond the timeout period, which is a configurable three seconds in the preferred embodiment of the present invention. The timeout period is measured by the timer set during step 922 of the processing of the BEGIN_CHOSEN routine. If the timer expires, an abort response message is sent to the manual operator console 122 and the used/unused flag corresponding to the element in the array is set to unused. The process for handling an expired timer is described further with reference to FIG. 13.

If the SDP 128 sends a message that is delayed beyond the timeout period, the dialog identifier is determined to be no longer valid as the used/unused flag is set to unused. The AIN_PROCESS_MSG_NIM layer discards the response message as the manual operator console 122A has already received an abort message and will not accept a response.

In step 1012, the AIN_PROCESS_MSG_IPC layer replaces the destination transaction identifier with the saved originating transaction identifier. The AIN_PROCESS_MSG_IPC layer identifies the element of the dialog array containing the NSPP header identifying the manual operator console 122A that sent the message using the dialog identifier that was retrieved from the destination transaction identifier of the transaction portion of the TCAP message. The AIN_PROCESS_MSG_IPC layer retrieves the originating transaction identifier from the identified element of the dialog array. Then the AIN_PROCESS_MSG_IPC layer populates or stores the originating transaction identifier in the destination transaction identifier field of the transaction portion of the TCAP message.

In step 1014, the AIN_PROCESS_MSG_IPC layer encodes the response TCAP message.

In step 1016, the AIN_PROCESS_MSG_IPC layer cancels the timer. The timer is canceled to ensure that the it does not go off.

In step 1018, the AIN_PROCESS_MSG_IPC layer sends the continue type TCAP message to the manual operator console 122A via TCAP_SEND. The continue type TCAP message contains the information requested by the manual operator console 122A in the return result component shown in Table 6 above. The information is stored in the parameter contents field shown in Table 6.

In step 1020, the AIN_PROCESS_MSG_IPC layer clears the array element and sets the array elements used/unused flag to unused. This allows the array element to be used to process another TCAP message request from the manual operator consoles 122.

Figure 11:
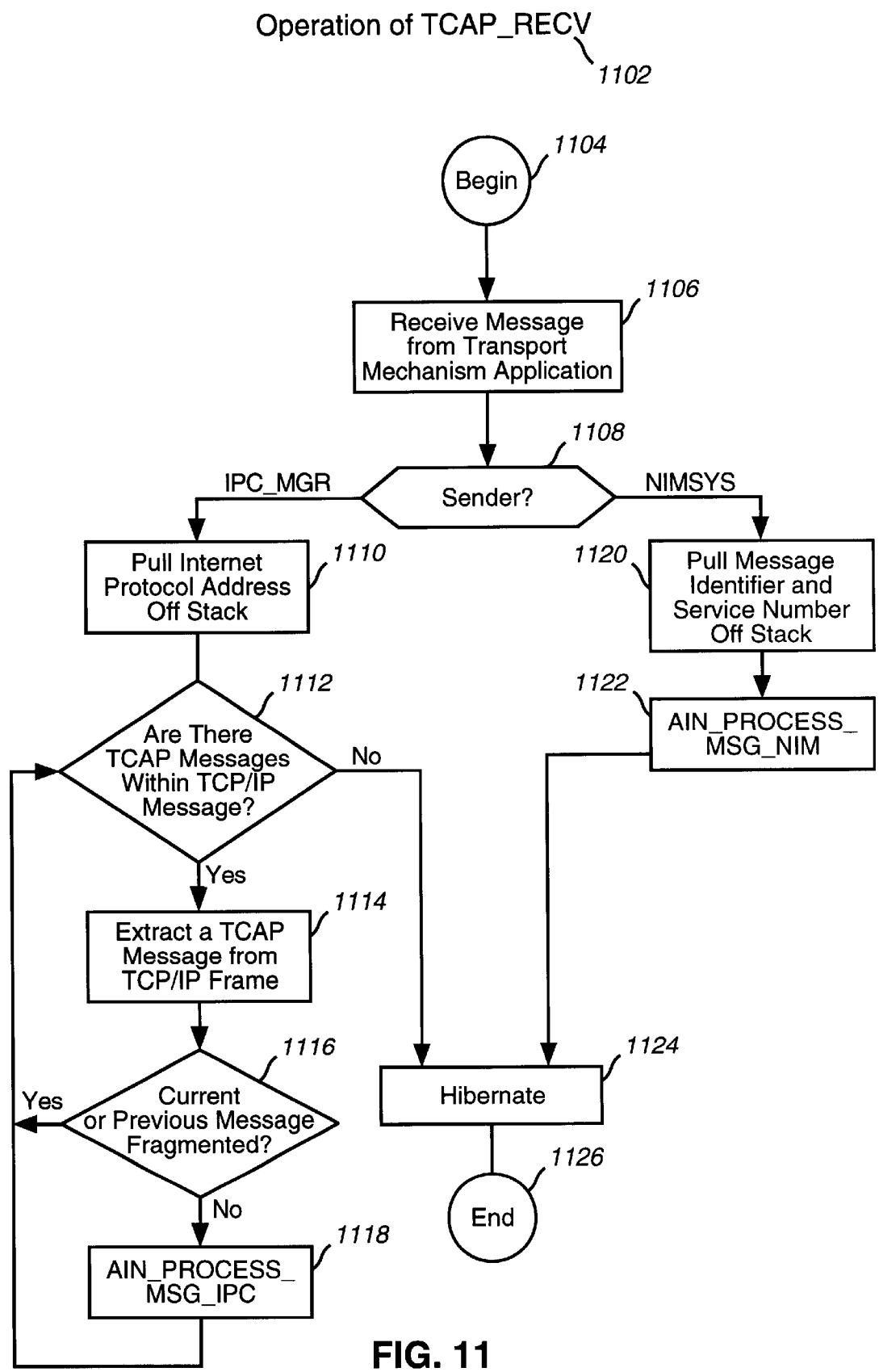
FIG. 11 illustrates the operation of a transaction capabilities application part message receive (TCAP_RECV) layer of the AIN_APP residing in the AINGW of FIGS. 2 and 3 according to a preferred embodiment of the present invention.

FIG. 11 is a flowchart 1102 which illustrates the operation of the TCAP_RECV layer. The present invention has a single point of contact for the AIN_APP 204 to receive messages from different transport mechanism applications, specifically the NIM 210 which interfaces with the manual operator consoles 122 and the IPC_MGR 206 which interfaces with the SDP 128. This single point of contact is provided by the TCAP_RECV layer.

In step 1106, the TCAP_RECV layer receives the TCAP message from the transport mechanism application, either the NIM 210 or the IPC_MGR 206. The TCAP_RECV layer receives messages from the NIM when a begin type TCAP message is sent from a manual operator console 122A as described in step 408 of FIG. 4. The TCAP_RECV layer receives messages from the IPC_MGR 206 when a continue type message is sent from a SDP 128 as described in step 418.

In step 1108, the TCAP_RECV layer determines the sender of the TCAP message. In other words, the TCAP_RECV layer determines whether the TCAP message was received from the IPC_MGR 206 or the NIM 210.

If the TCAP message was received from the IPC_MGR 206, step 1110 is performed. In step 1110, the TCAP_RECV layer pulls the internet protocol address off of the stack. The internet protocol address is one of three addresses associated with the SDP 128.

In step 1112, the TCAP_RECV layer determines whether there are TCAP messages within the TCP/IP message. A TCP/IP message may contain multiple TCAP messages. If the TCP/IP message does not contain TCAP messages, step 1124 is performed.

In step 1114, the TCAP_RECV layer extracts the TCAP message from the TCP/IP frame.

In step 1116, the TCAP_RECV layer determines whether a current or previous TCAP message was fragmented. The TCAP_RECV layer determines whether the message is complete. If the message is fragmented or incomplete, the TCAP_RECV layer stores the message in an array and sets a timer. If the remainder of the TCAP message is received in another TCP/IP frame before end of the timeout period, the TCAP_RECV layer will process the completed TCAP response message. If the remainder of the TCAP message is not received within the timeout period, the array element will be cleared. If no response TCAP message is received, the timer set during processing of the BEGIN_CHOSEN routine in step 922 of FIG. 9 will expire and the AIN_TIMER_EXPIRED routine will be processed. The AIN_TIMER_EXPIRED will be described in more detail with reference to FIG. 13.

In step 1118, the TCAP_RECV layer calls the AIN_PROCESS_MSG_IPC layer. After the AIN_PROCESS_MSG_IPC layer is processed, step 1112 is performed.

If the TCAP message was received from the NIM 210, step 1120 is performed. In step 1120, the TCAP_RECV layer pulls the message identifier and service number off of the stack. The message identifier and service number are NSPP parameters that identify the message. The message identifier is populated in the response TCAP message.

In step 1122, the TCAP_RECV layer calls the AIN_PROCESS_MSG_NIM layer. The AIN_PROCESS_MSG_NIM layer is described in more detail in FIG. 11. After the AIN_PROCESS_MSG_NIM layer is processed, step 1124 is performed.

In step 1124, the TCAP_RECV layer hibernates and waits for another TCAP message.

Figure 12:
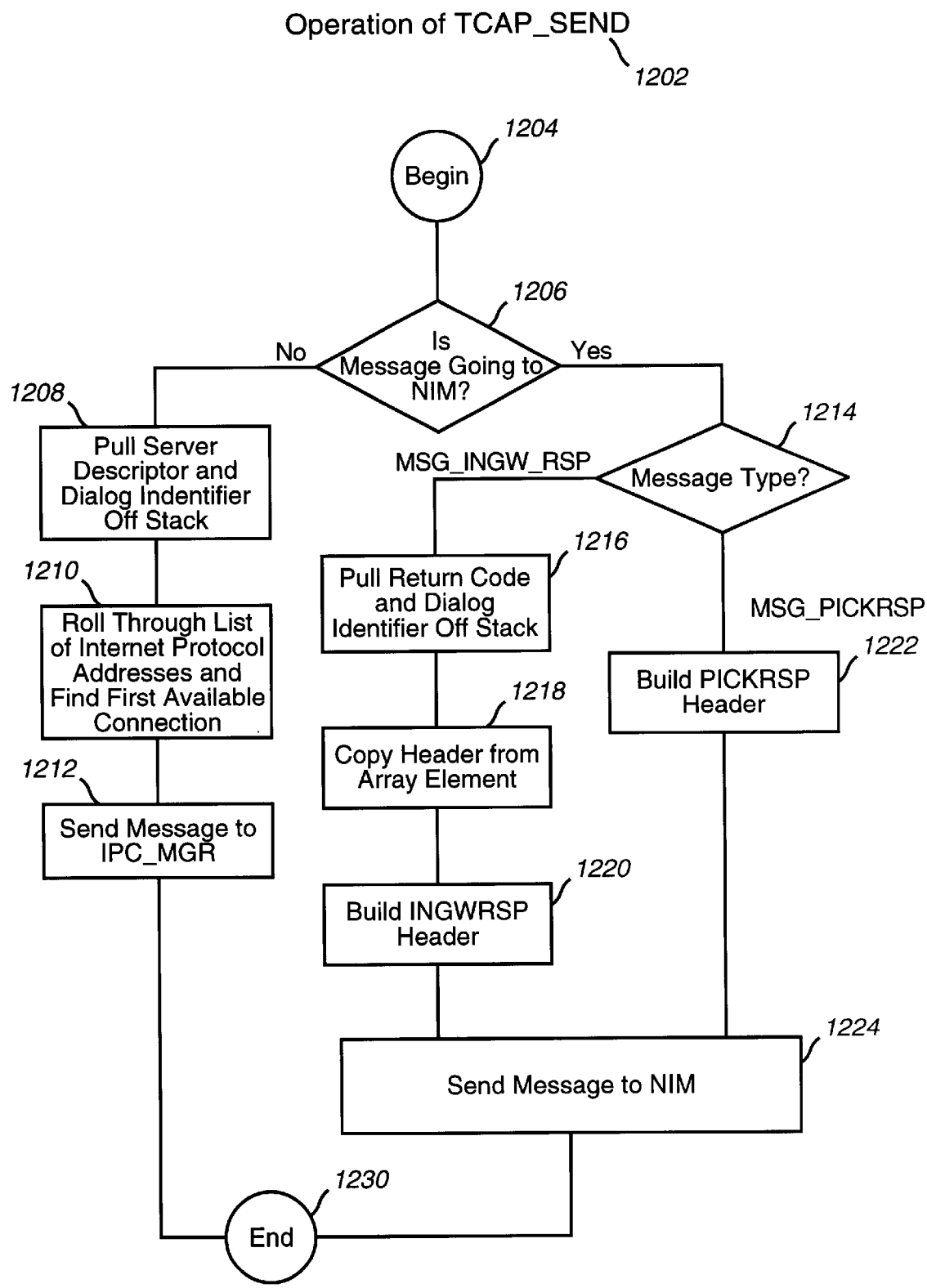
FIG. 12 illustrates the operation of a transaction capabilities application part message send (TCAP_SEND) layer of the AIN_APP residing in the AINGW of FIGS. 2 and 3 according to a preferred embodiment of the present invention.

FIG. 12 is a flowchart 1202 which illustrates the operation of the TCAP_SEND layer. The TCAP_SEND layer sends messages to the transport mechanism applications. Like the receive routine, the TCAP_SEND layer is a single point of contact sending messages to different transport mechanism applications, specifically the NIM 210 and the IPC_MGR 206.

In step 1206, the TCAP_SEND layer determines whether the message is going to NIM. The TCAP_SEND layer determines which transport mechanism application, the IPC_MGR or the NIM 210, will receive the TCAP message.

If in step 1206 it is determined that the IPC_MGR 206 is receiving the TCAP message, then step 1208 is performed. If the IPC_MGR 206 is not receiving the TCAP message, the TCAP_SEND layer proceeds to step 1214. In step 1208, the TCAP_SEND layer pulls the server descriptor and dialog identifier off the stack. The server descriptor includes the server_key and the internet protocol addresses corresponding to the server_key.

In step 1210, the TCAP_SEND layer rolls through the list of internet protocol addresses and finds the first available connection. The TCAP_SEND determines whether connectivity exists to the address on the IPC_MGR and communication can be established. If connectivity does not exist, TCAP_SEND attempts to initiate communication with another address on the IPC_MGR 206. If connectivity does exist, TCAP_SEND proceeds to step 1212.

In step 1212, the TCAP_SEND layer sends the message to the IPC_MGR 206. Operation of TCAP_SEND illustrated by flowchart 1202 is complete after step 1212 is performed as indicated by step 1230.

If in step 1206, it is determined that the NIM 210 is receiving the TCAP message, step 1214 is performed. In step 1214, the TCAP_SEND layer determines the message type. A message type is one of the message types defined by NSPP. The two possible message types that may be sent include MSG_INGW_RSP and MSG_PICKRSP.

Each of the message types causes the TCAP_SEND layer to perform a different function. The MSG_PICKRSP message type is sent to the manual operator console 122A during start up to establish that the AIN_APP 204 is an available service. The MSG_INGW_RSP message type is sent to the manual operator console 122A to signal that a response to a TCAP message is being sent providing the information that was requested from the SDP 128.

If in step 1214, it is determined that the message type is MSG_INGW_RSP, step 1216 is performed. In step 1216, the TCAP_SEND layer pulls the return code and dialog identifier off of the stack. The return code indicates whether the message succeeded or failed.

In step 1218, the TCAP_SEND layer copies the header from the array element. The NSPP compatible header was stored in the internal dialog array by the AIN_PROCESS_MSG_NIM in step 816 of FIG. 8.

In step 1220, the TCAP_SEND layer builds the INGWRSP message header. The INGWRSP message header is a NSPP compatible header. The TCAP_SEND layer constructs NSPP headers so that the TCAP message to be understood by the NIM 210. After step 1220 is performed, the TCAP_SEND layer proceeds to step 1224.

If in step 1214, it is determined that the message type is MSG_PICKRSP, step 1222 is performed. In step 1222, the TCAP_SEND layer builds the PICKRSP message header. The PICKRSP message header is compatible with NSPP.

In step 1224, the TCAP_SEND layer sends the message to NIM 210. Operation of TCAP_SEND, illustrated in flowchart 1202, is complete after step 1224 is performed as indicated by step 1230.

Figure 13:
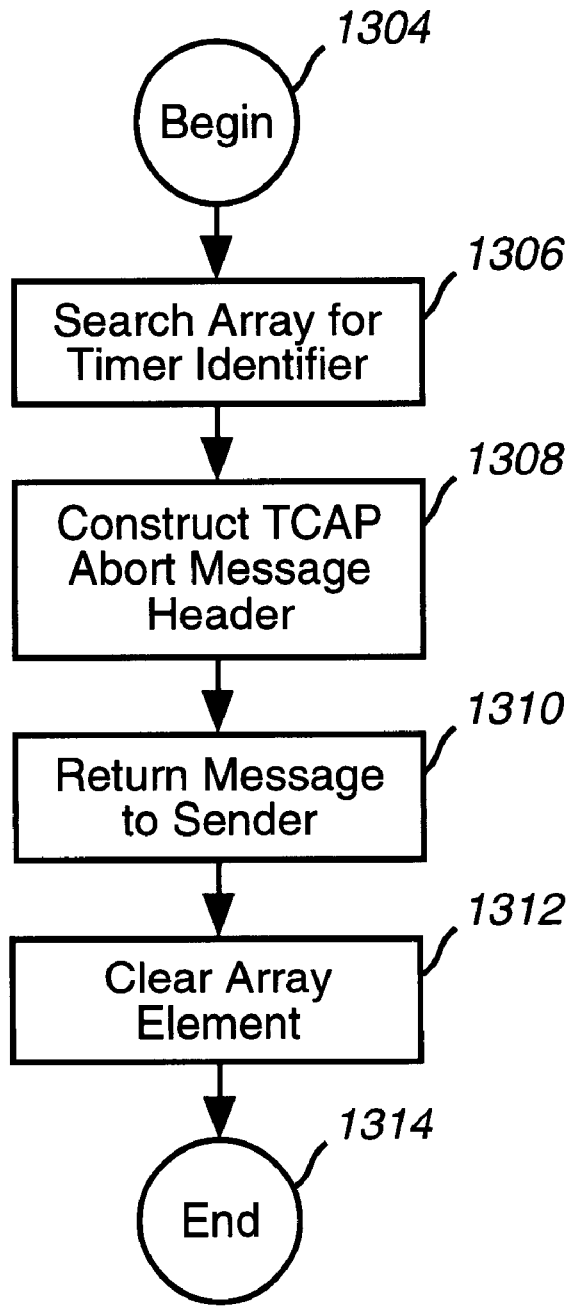
FIG. 13 illustrates the operation of an advanced intelligent network timer expired (AIN_TIMER_EXPIRED) routine of the AIN_APP residing in the AINGW of FIGS. 2 and 3 according to a preferred embodiment of the present invention.

FIG. 13 illustrates the operation of the advanced intelligent network timer expired (AIN_TIMER_EXPIRED) routine 1302.

In step 1304, the AIN_TIMER_EXPIRED routine searches the array for the timer identifier corresponding to the timer that has expired.

In step 1306, the AIN_TIMER_EXPIRED routine constructs a TCAP abort message header.

In step 1308, the AIN_TIMER_EXPIRED routine returns a TCAP abort message to the sender. The TCAP abort message informs the manual operator console 122A that the request message was unsuccessful. If information was requested by the manual operator console 122A from the SDP 128, the TCAP abort message indicates that the manual operator console 122A will not receive the requested information within the timeout period.

In step 1310, the AIN_TIMER_EXPIRED routine clears the array element. The data contained in the array element is cleared and the used/unused flag of the array element is set to unused. This allows the array element to be used to process another TCAP message. Operation of the AIN_TIMER_EXPIRED routine is complete after step 1310 is performed as shown in step 1312.

Other embodiments of the present invention are possible. Referring to FIG. 1, the AINGW 124 may be used in other environments requiring protocol conversion. For example, the present invention may also include a SS7_MGR (Signaling System Number 7 manager) that is used to interface with one or more computer systems using SS7 (Signaling System Number 7) protocol. SS7 protocol complies with the ITU standard described in the previously referenced document. SS7 protocol would be used to communicate with a computer system that interfaced with the SDP 128.

In an embodiment including the SS7_MGR, the present invention converts from NSPP to SS7 protocol. The TCAP_RECV and TCAP_SEND layers include additional steps. In TCAP_RECV, an additional step is included to determine if the message is received from the SS7_MGR. If the message is received from the SS7_MGR, the AIN_PROCESS_MSG_IPC layer is processed. In the TCAP_SEND layer, additional steps are included to determine if the message is being sent to the SS7_MGR. If so, the processing is similar to if the message is sent to the IPC_MGR 206. In addition, the AIN_PROCESS_MSG_IPC and AIN_PROCESS_MSG_NIM layers include a step of determining whether the message is being communicated using the IPC_MGR 206 or the SS7_MGR. The decoding and constructing mechanisms include slight modifications needed to make the message compatible with SS7.

Additional embodiments are possible that do not include the starting and monitoring processes as they are described. Other starting and monitoring processes may be used and monitoring processes may be omitted. The starting and monitoring processes include the basic overseer service, alarm screener, operational measurements process, and the human machine interface.

While various embodiments of the present invention have been described above, it should be understood that they have been presented by way of example only, not limitation. Thus the breadth and scope of the present invention should not be limited by any of the above-described exemplary embodiments, but should be defined only in accordance with the following claims and their equivalents.

| Glossary | |
|---|---|
| ACD: | Automated Call Distributor |
| | The ACD provides switching functionality between the selected manual operator console and the interexchange network. |
| AIN: | Advanced Intelligent Network Gateway |
| | The advanced intelligent network gateway is a computer system that provides message transfer and protocol conversion allowing communication between the manual operator consoles and the SDP. |
| AIN_APP: | Advanced Intelligent Network Application |
| | The AIN_APP is a computer program that includes software layers for receiving, processing, and sending messages between the NIM and the IPC_MGR. |
| AIN_MAIN: | Advanced Intelligent Network Main Layer |
| | The AIN_MAIN is the first layer processed in the AIN_APP. The AIN_MAIN establishes connections between the IPC_MGR 206 and the NIM 210. |
| AIN_PROCESS_MSG_IPC: | Advanced Intelligent Network Process Message IPC |
| | AIN_PROCESS_MSG_IPC processes messages received from the SDP that are to be sent to the manual operator consoles. |
| AIN_PROCESS_MSG_NIM: | Advanced Intelligent Network Process Message NIM |
| | AIN_PROCESS_MSG_NIM processes messages received from the manual operator consoles that are to be sent to the SDP. |
| BOSS: | Basic Overseer Service |
| | BOSS is responsible for starting, stopping, and monitoring the processes on the advanced intelligent network gateway. |
| HMI: | Human Machine Interface |
| | The HMI provides access via a series of software menus which allow the configuration, addition, or deletion of configurable entities within the computer programs on the AIN. |
| IPC_MGR: | Interprocess Communications Manager |
| | The IPC_MGR is an interface layer that allows interprocess communication protocol programs to communicate with programs not using an interprocess |

-continued

Glossary

| | |
|---|---|
| | communication protocol. |
| ISNAP: | Intelligent Service Network Applications Processor |
| | The ISNAP selects a manual operator console and ensures that incoming calls are distributed among the logically defined groups of manual operator consoles. |
| NIDS: | Network Information Distribution Service |
| | NIDS is a network that distributes information such as a client-server network. |
| NIM: | NSPP Interface Module |
| | The NIM is an interface layer that allows programs using a client/server protocol such as NSPP to communicate with programs not using a client/server protocol. |
| NSPP: | Network Information Distribution Service (NIDS) Sequenced Packet Protocol |
| | NSPP is a session oriented, guaranteed delivery, packet exchange protocol. NSPP provides communications with client-server programs which use UDP/IP. |
| OM: | Operational Measurements |
| | The OM collects operating data from the processes on the AIN and uses the data to monitor the processes. |
| ONC LANs/WAN: | Operator Network Center Local Area Networks/Wide Area Network |
| | The ONC LANs/WAN assist in the distribution of calls among the manual operator consoles and provides information to the manual operator consoles to be used in the processing of calls. |
| SDP: | Service Data Point |
| | The SDP stores customer account information used for traffic handling, service provisioning, and billing of debit calls. |
| SSCP: | Service Switching Control Point |
| | The SSCP provides automated menus that allow the debit customer to select options and provide information to process the call. |
| TCAP: | Transaction Capabilities Application Part |
| | TCAP refers to a TCAP message that complies with the ANSI SS7 ISUP industry standard and is used to transfer information between the manual operator consoles and the SDP. |
| TCAP_RECV: | Transaction Capabilities Application Part Receive |
| | TCAP_RECV is a single point of contact for receiving messages from different transport mechanism applications, specifically the NIM which interfaces with manual operator consoles, and the IPC_MGR which interfaces with the SDP. |
| TCAP_SEND: | Transaction Capabilities Application Part Send |
| | TCAP_SEND is a single point of contact for sending messages to different transport mechanism applications, specifically the NIM which sends messages to the manual operator consoles, and the IPC_MGR which sends messages to the SDP. |
| TCP/IP: | Transmission Control Protocol/Internet Protocol. |
| | TCP/IP is the protocol used by the SDP. |
| UDP/IP: | User Datagram Protocol/Internet Protocol |
| | A client/server protocol used by the manual operator consoles. |

What is claimed is:

1. A method for converting a protocol of a transaction capabilities application part message between a transmission control protocol/internet protocol implementation and a user datagram protocol/internet protocol implementation, comprising the steps of:

(a) receiving the transaction capabilities application part message from a sender;

(b) determining the protocol of the transaction capabilities application part message;

(c) if in step (b) it is determined that the protocol of the transaction capabilities application part message is the transmission control protocol/internet protocol implementation, pulling an internet protocol address off of a stack;

(d) determining whether an additional transaction capabilities application part message is within a transmission control protocol/internet protocol frame;

e converting the protocol of the transaction capabilities application part message between the user datagram protocol/internet protocol implementation and the transmission control protocol/internet protocol implementation; and f sending the transaction capabilities application part message.

2. The method of claim 1, further comprising the step of:

calling a software layer for conversion from the datagram protocol to the transmission control protocol/internet protocol.

3. The method of claim 1, further comprising the steps of:

(i) if it is determined in step (d) that said additional transaction capabilities application part message is within said transmission control protocol/internet protocol frame, extracting the transaction capabilities application part message from said transmission control protocol/internet protocol frame;

(ii) determining whether the transaction capabilities application part message is fragmented; and (iii) if in step ii it is determined that the transaction capabilities application part message not fragmented, calling a software layer for conversion from transmission control protocol/internet protocol to user datagram protocol/Internet protocol.

4. The method of claim 1, wherein step (b) comprises the steps of:

(i) determining a value of an operation code; and (ii) if it is determined in step (i) that said operation code is UNKNOWN, logging an alarm invalid message.

5. The method of claim 1, wherein step (e) comprises the steps of:

(i) determining a value of an operation code; and (ii) if it is determined in step (i) that said operation code is MSG_PICK, sending a PICK_RSP message to said sender.

6. The method of claim 1, wherein step (e) comprises the steps of:

(i) determining a value of an operation code; and (ii) if it is determined in step (i) that said operation code is MSG_INGW_REQ, finding a first array element;

(iii) storing a header of the transaction capabilities application part message;

(iv) decoding the transaction capabilities application part message; and (v) determining a variable value of a choice variable.

7. The method of claim 6, further comprising the steps of:

(vi) if it is determined in step (vi) that said variable value of said choice variable is selected from the group consisting of END, ABORT, CONTINUE, UNKNOWN, and UNIDIRECTIONAL, logging an alarm invalid message;

(vii) creating an abort message; and (viii) sending said abort message to said sender.

8. The method of claim 6, further comprising the steps of:

(vi) if it is determined in step (vi) that said variable value of said choice variable is BEGIN_CHOSEN, saving an originating transaction identifier in an array element;

(vii) setting a used/unused flag corresponding to said array element to used;

(viii) validating said originating transaction identifier;

(ix) extracting a server_key from said originating transaction identifier;

(x) converting said server_key from binary coded decimal format to integer format;

(xi) validating said server_key;

(xii) adding 0x1000000 to a dialog identifier corresponding to said array element to convert said dialog identifier to hexadecimal format;

(xiii) populating the transaction capabilities application part message with said dialog identifier;

(xiv) encoding the transaction capabilities application part message; and (xv) setting a timer to record time for a response to the transaction capabilities application part message.

9. The method of claim 1, wherein step (e) comprises the steps of:

validating an internet protocol address;

returning a pointer to a service descriptor;

decoding the transaction capabilities application part message;

extracting a dialog identifier associated with an array element from the transaction capabilities application part message;

validating said dialog identifier;

retrieving an originating transaction identifier from said array element;

replacing a destination transaction identifier in the transaction capabilities application part message with said originating transaction identifier; and encoding the transaction capabilities application part message.

10. The method of claim 9, further comprising the step of canceling a timer that was set to record time for a response to said transaction capabilities application part message.

11. The method of claim 9, further comprising the steps of:

clearing said array element; and setting a used/unused flag corresponding to said array element to unused.

12. The method of claim 1, wherein step (e) comprises the steps of:

searching one or more array elements of an array for an array element corresponding to a timer identifier;

constructing an abort header for the transaction capabilities application part message;

returning the transaction capabilities application part message; and clearing a dialog array element corresponding to the transaction capabilities application part message identified by information in said one of one or more array elements corresponding to said timer identifier.

13. The method of claim 1, wherein step (e) comprises the steps of:

(i) determining a recipient of the transaction capabilities application part message;

(ii) if it is determined in step (i) that said recipient requires said transaction capabilities application part message in the transmission control protocol/internet protocol implementation, pulling a server descriptor and a dialog identifier off of a stack;

(iii) rolling through a list of one or more internet protocol addresses;

(iv) finding an available connection; and (v) sending the transaction capabilities application part message to an interprocess communications manager.

14. The method of claim 1, wherein step (e) comprises the steps of:

(i) determining a recipient of the transaction capabilities application part message; and (ii) if it is determined in step (i) that said recipient requires the transaction capabilities application part message in the user datagram protocol/internet protocol implementation, determining a message type of the transaction capabilities application part message.

15. The method of claim 14, further comprising the steps of:

(iii) if it is determined in step (ii) that said message type is MSG_PICKRSP, building a PICKRSP message header; and (iv) sending the transaction capabilities application part message to a NSPP interface module.

16. The method of claim 14, further comprising the steps of:
   (iii) if it is determined in step (ii) that said message type is MSG_INGW_RSP, pulling a return code and dialog identifier off of a stack;
   (iv) copying a header from an array element;
   (v) building an INGWRSP message header; and
   (vi) sending the transaction capabilities application part message to a NSPP interface module.

17. A method for performing protocol conversion of a transaction capabilities application part message, comprising:
   receiving the transaction capabilities application part message;
   maintaining an array having one or more array elements;
   finding an available one of said one or more array elements;
   retrieving data from the transaction capabilities application part message;
   saving said data in said available one of said one or more array elements;
   sending the transaction capabilities application part message;
   receiving a response transaction capabilities application part message;
   retrieving said data from said array element;
   repopulating said data in said response transaction capabilities application part message; and
   sending said response transaction capabilities application part message.

18. A computer system for performing protocol conversion of a transaction capabilities application message, comprising:
   means for overseeing processing during protocol conversion;
   means for interfacing with a received computer program;
   means for interfacing with a sending computer program;
   means for performing protocol conversion of the transaction capabilities application part message between a transmission control protocol/internet protocol implementation and a user datagram protocol/internet protocol implementation; and
   means for initiating communication with said means for interfacing with a receiving computer program, wherein said means for initiating and said means for interfacing with a sending computer program further comprise:
      means for reading and validating an advanced intelligent network application configuration file;
      means for attaching to said means for interfacing with said receiving computer program;
      means for attaching to said means for interfacing with said sending computer program;
      means for initializing an array;
      means for establishing communications; and
      means for hibernating.

19. The computer system of claim 18 wherein said means for overseeing processing during protocol conversion comprises:
   means for reading a basic overseer service configuration file;
   means for starting one or more computer program layers in said basic overseer service configuration file; and
   means for monitoring said one or more computer program layers in said basic overseer service configuration file.

20. A computer system for performing protocol conversion of a transaction capabilities application message, comprising:
   means for overseeing processing during protocol conversion;
   means for interfacing with a received computer program;
   means for interfacing with a sending computer program;
   means for performing protocol conversion of the transaction capabilities application part message between a transmission control protocol/internet protocol implementation and a user datagram protocol/internet protocol implementation, said means for performing protocol conversion further comprising:
      means for initiating communication with said means for interfacing with said receiving computer program and means for interfacing with said sending computer program;
      means for receiving the transaction capabilities application part message;
      means for performing protocol conversion of the transaction capabilities application part message; and
      means for sending the transaction capabilities application part message, wherein said means for initiating communication with said means for interfacing with a receiving computer program and said means for interfacing with a sending computer program comprise:
         means for reading and validating an advanced intelligent network application configuration file; means for attaching to said means for interfacing with said receiving computer program; means for attaching to said means for interfacing with said sending computer program; means for initializing an array; means for establishing communications; and means for hibernating.

* * * * *